(12) United States Patent
Channell et al.

(10) Patent No.: US 6,206,042 B1
(45) Date of Patent: Mar. 27, 2001

(54) MODULAR CONTROL APPARATUS FOR WATER TREATMENT SYSTEM

(75) Inventors: Alan B. Channell, Columbia City; Rudy B. Wilfong; Robert W. Wilfong, both of Fort Wayne; Danny J. Painter, New Haven, all of IN (US)

(73) Assignee: Chemical Engineering Corporation, Churubusco, IN (US)

( * ) Notice: Subject to any disclaimer, the term of this patent is extended or adjusted under 35 U.S.C. 154(b) by 0 days.

(21) Appl. No.: 09/250,535

(22) Filed: Feb. 16, 1999

Related U.S. Application Data
(60) Provisional application No. 60/077,034, filed on Mar. 6, 1998.

(51) Int. Cl.[7] .............................. C02F 1/42; F16K 31/48
(52) U.S. Cl. ................... 137/624.2; 137/624.13; 137/624.15; 137/271; 251/129.12; 210/190
(58) Field of Search ........................ 137/624.11, 624.13, 137/624.2, 269, 271, 624.15; 210/190; 251/129.11, 129.12

(56) References Cited

U.S. PATENT DOCUMENTS

| | | |
|---|---|---|
| D. 331,097 | 11/1992 | Sieren . |
| D. 332,480 | 1/1993 | Sieren . |
| 2,631,665 | 3/1953 | Perrin . |

(List continued on next page.)

FOREIGN PATENT DOCUMENTS

| | | |
|---|---|---|
| 0 747 325 A2 | 12/1996 | (EP) . |
| 61-141991 | 6/1986 | (JP) . |
| 7-265722 | 10/1995 | (JP) . |
| WO 90/00527 | 1/1990 | (WO) . |

OTHER PUBLICATIONS
European Search Report Dated Oct. 7, 1999.

*Primary Examiner*—Kevin Lee
(74) *Attorney, Agent, or Firm*—Baker & Daniels

(57) ABSTRACT

A modular modular control apparatus for a water treatment system which periodically undergoes a regeneration cycle including a backwash phase and a replenishment phase. The modular control apparatus has a modular design which includes interchangeable timer modules, a drive motor module, a drive mechanism, a valve cartridge unit, a brine valve module and interchangeable brine valve levers. The timer modules are rugged and relatively inexpensive but are not adjustable. Thus, to adjust the predetermined interval between regeneration cycles, a different timer module is installed. The drive mechanism includes two camming elements which in cooperation with an interchangeable lever and brine line sealing module draw a brine solution from the brine tank to replenish the treatment media and refill the brine tank with water to form a new brine solution. The use of interchangeable brine valve levers allows the quantity of brine solution used to replenish the treatment media to be easily adjusted. The valve cartridge includes a spool valve member, an inner piston and a guide assembly, which together form a unitary valve cartridge. The valve cartridge can be removed as a single unit which facilitates the installation, removal and repair of the cartridge. The control assembly also includes a user friendly housing. The front housing member is povotable whereby the valve cartridge and the control modules located in the interior of the housing are accessible from the front of the modular control apparatus. The valve body includes a brine valve module which is removable as a unit form the valve body. The sealing module is also removable as a unit from the brine valve module.

33 Claims, 27 Drawing Sheets

U.S. PATENT DOCUMENTS

| | | |
|---|---|---|
| 2,673,182 | 3/1954 | Hintz . |
| 2,684,942 | 7/1954 | Tice . |
| 2,698,293 | 12/1954 | Klumb . |
| 3,083,728 | 4/1963 | Schulze et al. . |
| 3,089,508 | 5/1963 | Schulze et al. . |
| 3,146,788 | 9/1964 | Mahlstedt et al. . |
| 3,246,759 | 4/1966 | Matalon . |
| 3,282,426 | 11/1966 | Entringer . |
| 3,286,839 | 11/1966 | Lyall . |
| 3,302,467 | 2/1967 | Prosser . |
| 3,352,419 | 11/1967 | Entringer et al. . |
| 3,385,441 | 5/1968 | Lyall . |
| 3,433,259 | 3/1969 | Hiers et al. . |
| 3,434,490 | 3/1969 | Lyall . |
| 3,441,047 | 4/1969 | Lyall et al. . |
| 3,443,114 | 5/1969 | Morrison . |
| 3,450,265 | 6/1969 | Kreusch et al. . |
| 3,452,890 | 7/1969 | Learmont . |
| 3,465,880 | 9/1969 | Lyall . |
| 3,482,604 | 12/1969 | Fleckenstein et al. . |
| 3,487,719 | 1/1970 | Lyall et al. . |
| 3,538,942 | 11/1970 | Lyall . |
| 3,580,615 | 5/1971 | Prosser . |
| 3,581,856 | 6/1971 | Fleckenstein . |
| 3,587,329 | 6/1971 | Fleckenstein . |
| 3,616,820 | 11/1971 | Fleckenstein . |
| 3,675,041 | 7/1972 | Elliott et al. . |
| 3,691,441 | 9/1972 | Hasselbach et al. . |
| 3,701,360 | 10/1972 | Morrison . |
| 3,705,428 | 12/1972 | Braswell . |
| 3,774,763 | 11/1973 | Yall et al. . |
| 3,823,086 | 7/1974 | Schmidt . |
| 3,872,004 | 3/1975 | Grout et al. . |
| 3,926,071 | 12/1975 | Elliott . |
| 3,976,101 | 8/1976 | Bassett . |
| 4,003,710 | 1/1977 | Fleckenstein et al. . |
| 4,026,801 | 5/1977 | Ward . |
| 4,090,964 | 5/1978 | Bakken et al. . |
| 4,257,887 | 3/1981 | Rak et al. . |
| 4,290,451 | 9/1981 | Fleckenstein et al. . |
| 4,299,698 | 11/1981 | Rak et al. . |
| 4,313,825 | 2/1982 | Fleckenstein et al. . |
| 4,385,992 | 5/1983 | Clauer et al. . |
| 4,426,294 | 1/1984 | Seal . |
| 4,469,602 | 9/1984 | Seal . |
| 4,470,911 | 9/1984 | Reinke . |
| 4,490,249 | 12/1984 | Seal . |
| 4,536,845 | 8/1985 | Devale et al. . |
| 4,668,402 | 5/1987 | Norton . |
| 4,676,403 | 6/1987 | Goudy, Jr. et al. . |
| 4,687,031 | 8/1987 | Goudy, Jr. et al. . |
| 4,919,314 | 4/1990 | Nishiyama et al. . |
| 4,986,771 | 1/1991 | Braswell . |
| 5,033,509 | 7/1991 | Tsai . |
| 5,066,393 | 11/1991 | Padera et al. . |
| 5,069,243 | 12/1991 | Foreman . |
| 5,073,255 | 12/1991 | Chili et al. . |
| 5,089,140 | 2/1992 | Brane et al. . |
| 5,116,491 | 5/1992 | Brane et al. . |
| 5,141,653 | 8/1992 | Smith et al. . |
| 5,152,252 | 10/1992 | Bolton et al. . |
| 5,157,979 | 10/1992 | Brane et al. . |
| 5,256,283 | 10/1993 | Buettner . |
| 5,273,070 | 12/1993 | Chili et al. . |
| 5,300,230 | 4/1994 | Brane et al. . |
| 5,334,300 | 8/1994 | Herron et al. . |
| 5,378,370 | 1/1995 | Brane et al. . |
| 5,407,553 | 4/1995 | Herron et al. . |
| 5,590,687 | 1/1997 | Vaughan . |
| 5,628,899 | 5/1997 | Vaughan . |
| 5,921,270 * | 7/1999 | McCarty ..................... 137/624.13 X |

* cited by examiner

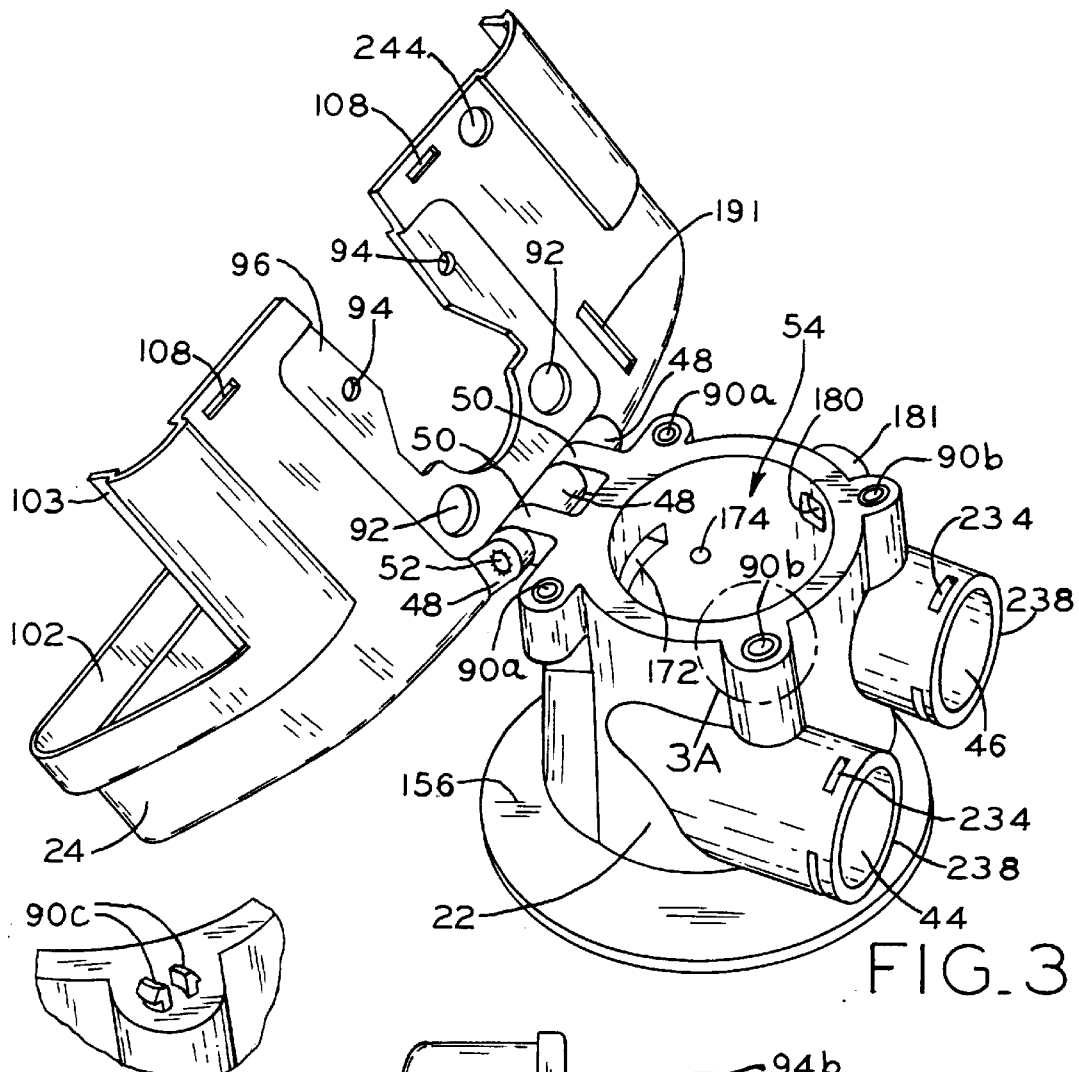
FIG. 3
FIG. 3A
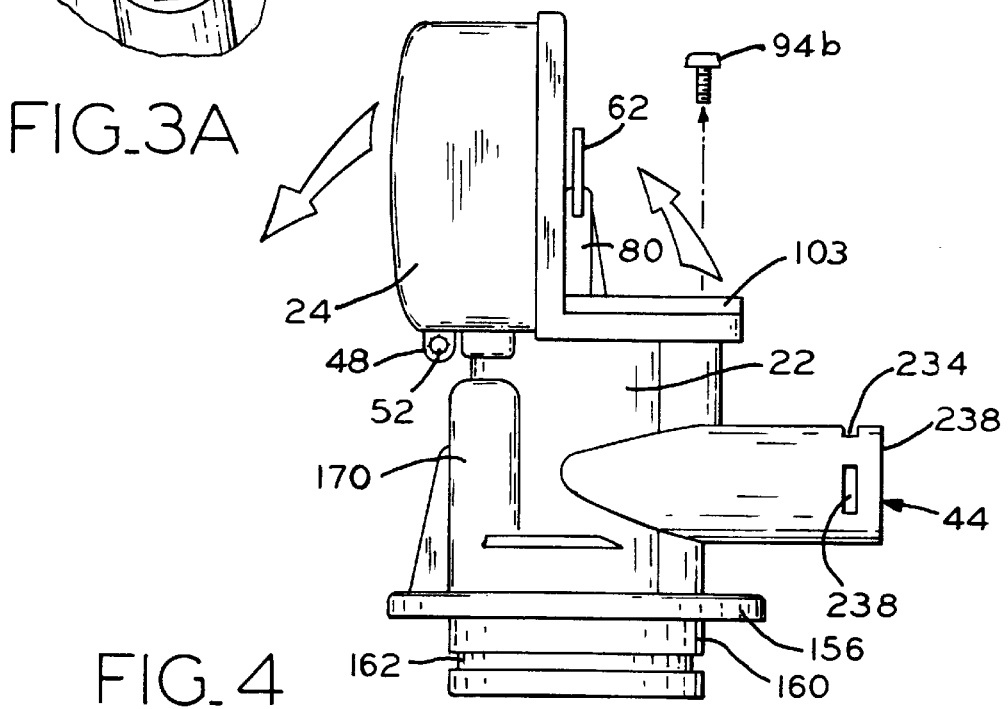
FIG. 4

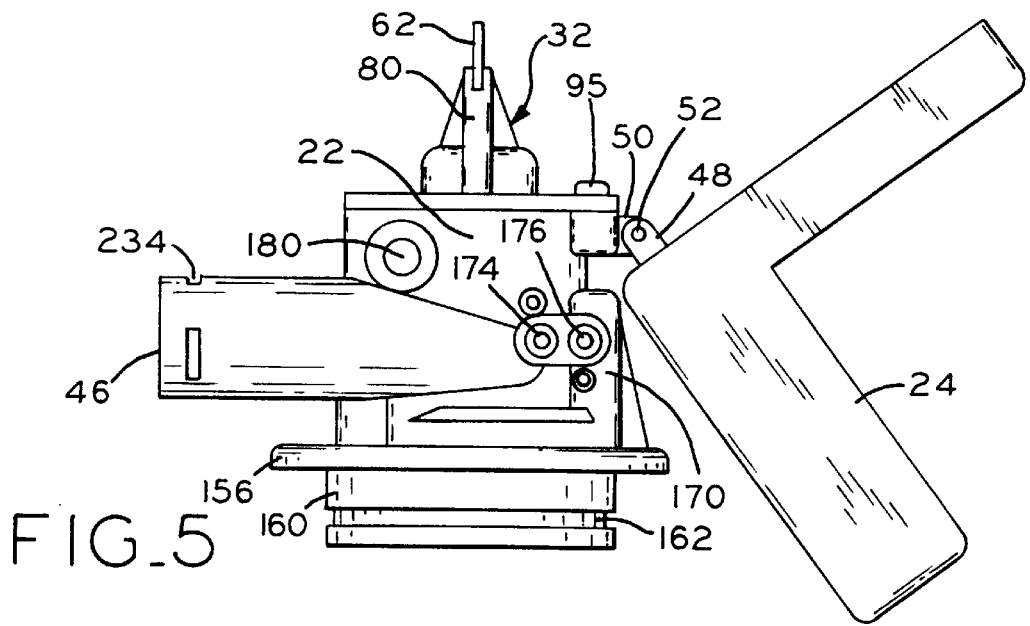
FIG_5
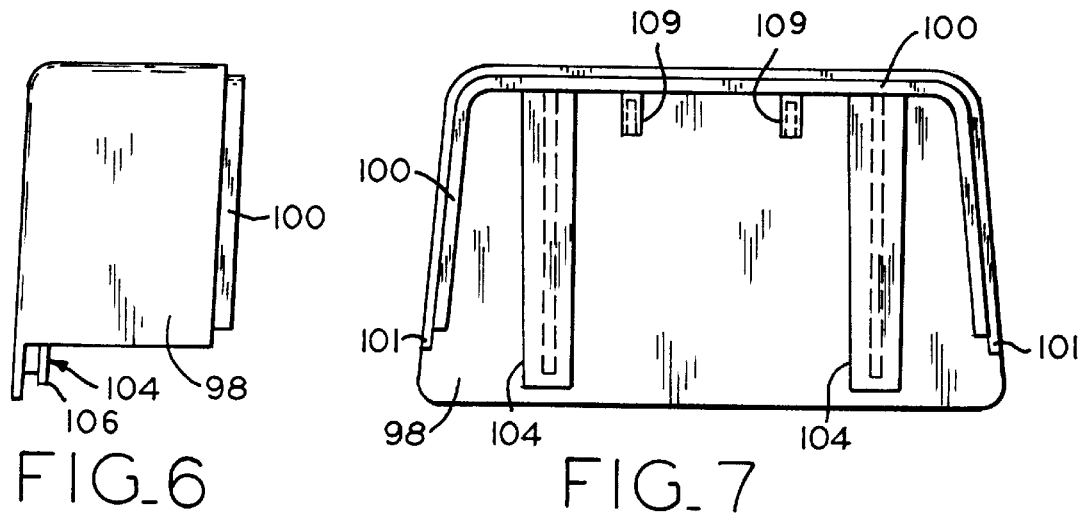
FIG_6  FIG_7
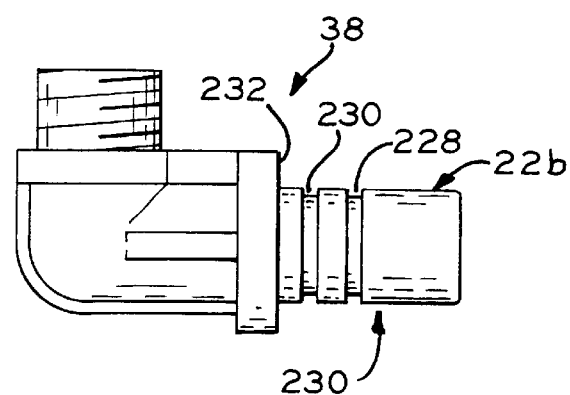
FIG_8

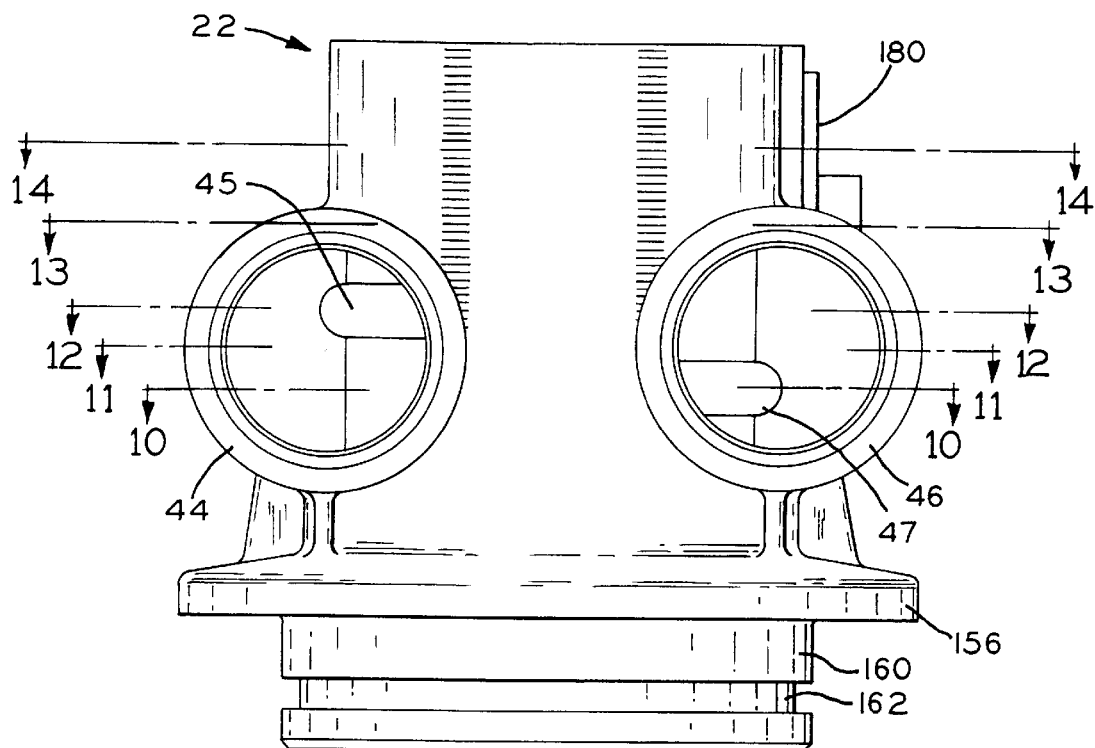
FIG_9
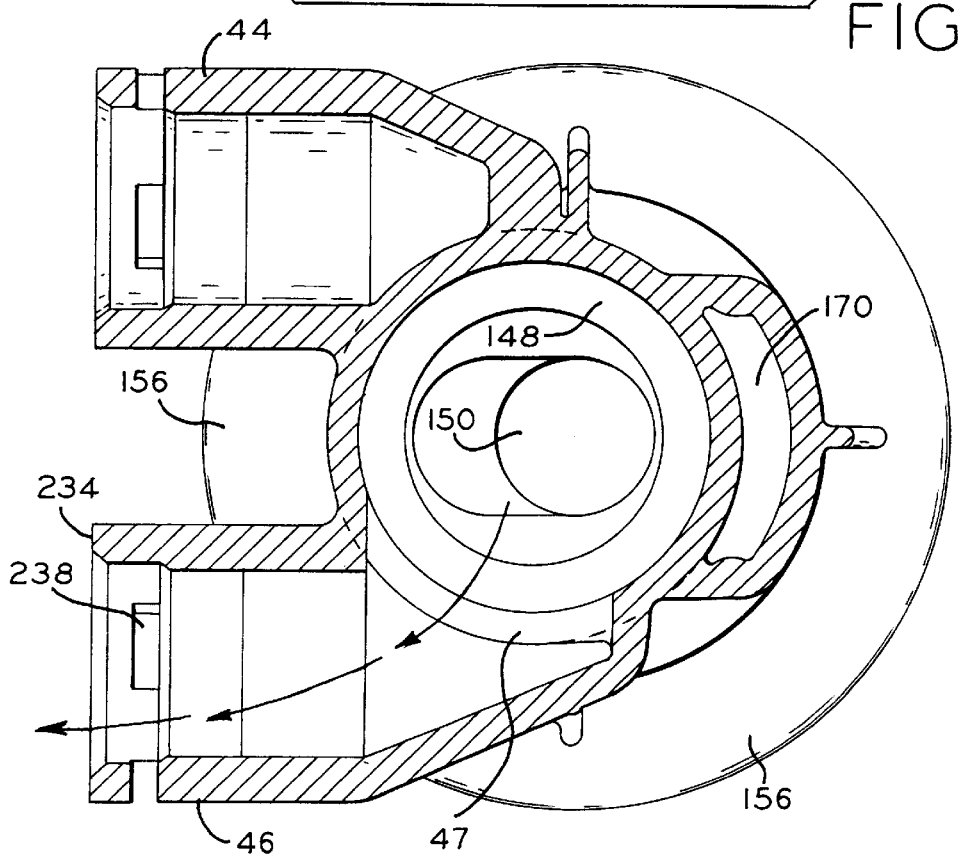
FIG_10

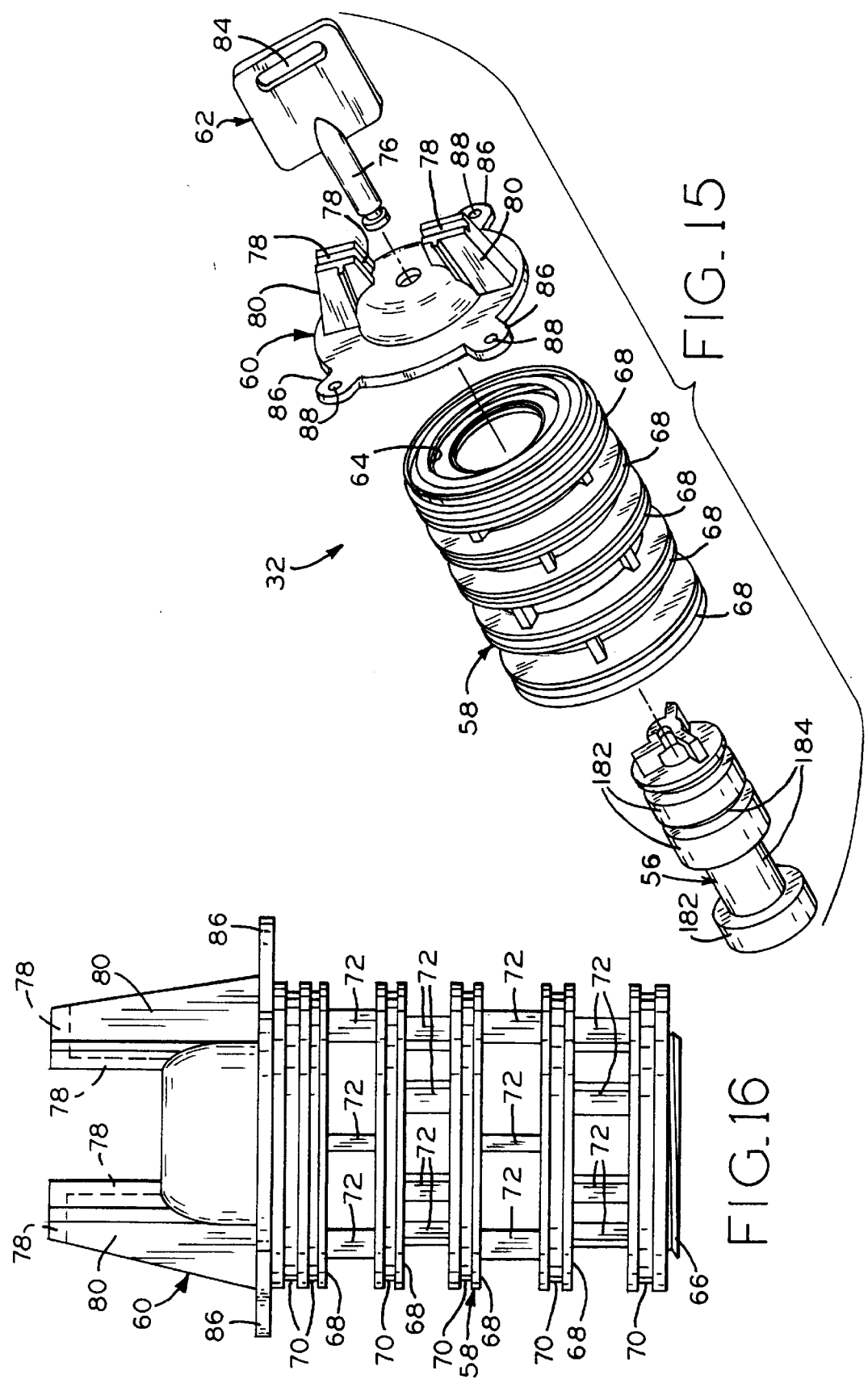

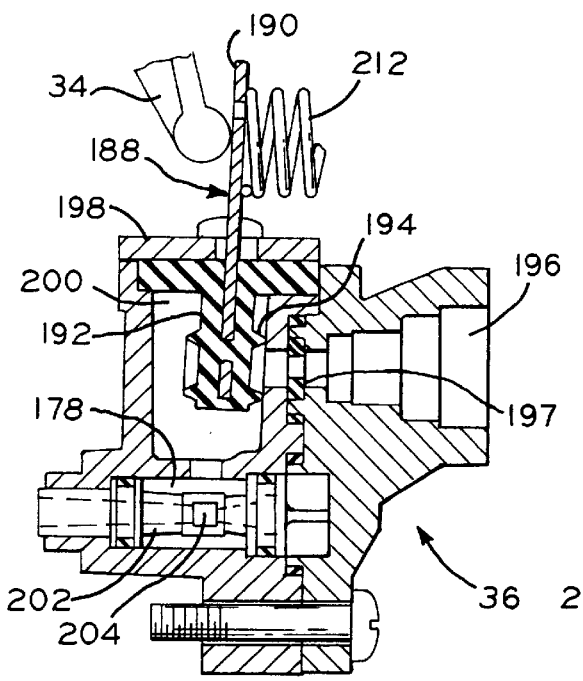
FIG_17
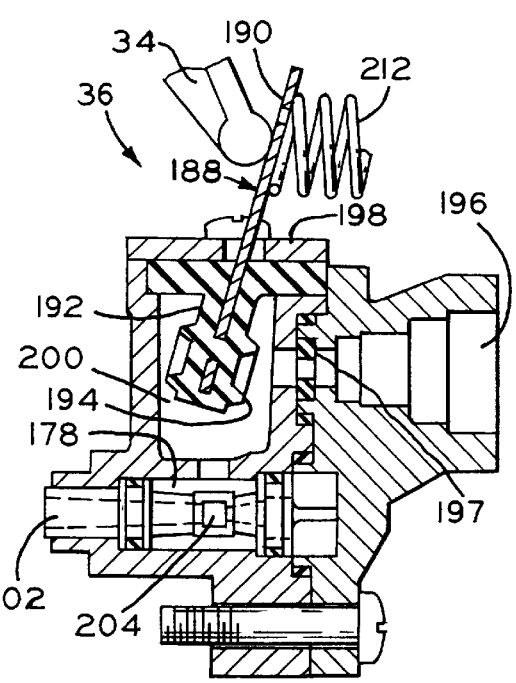
FIG_18
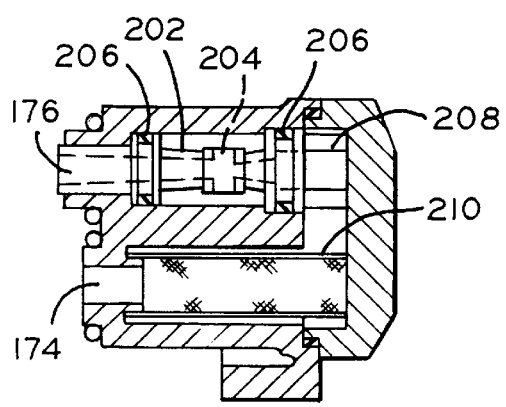
FIG_19
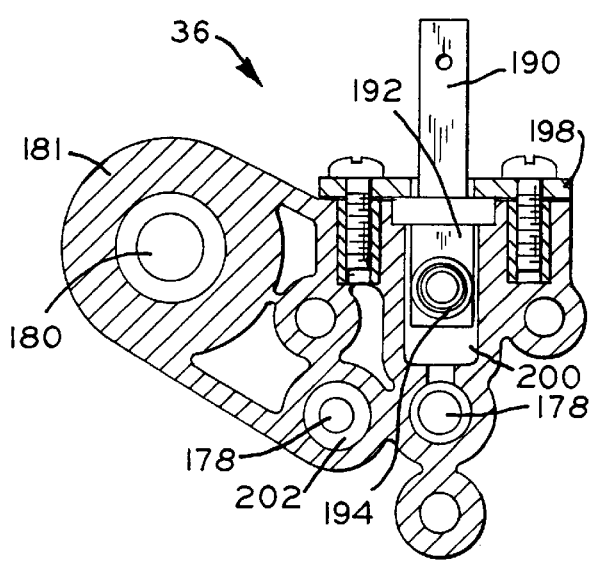
FIG_20

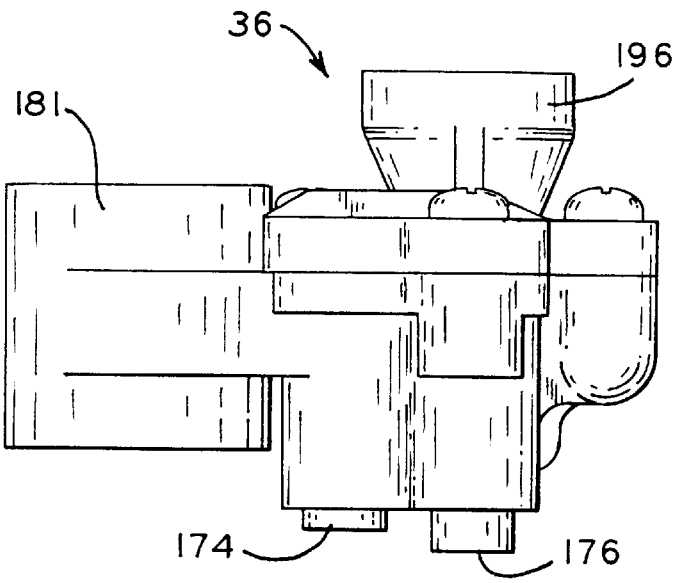
FIG_26
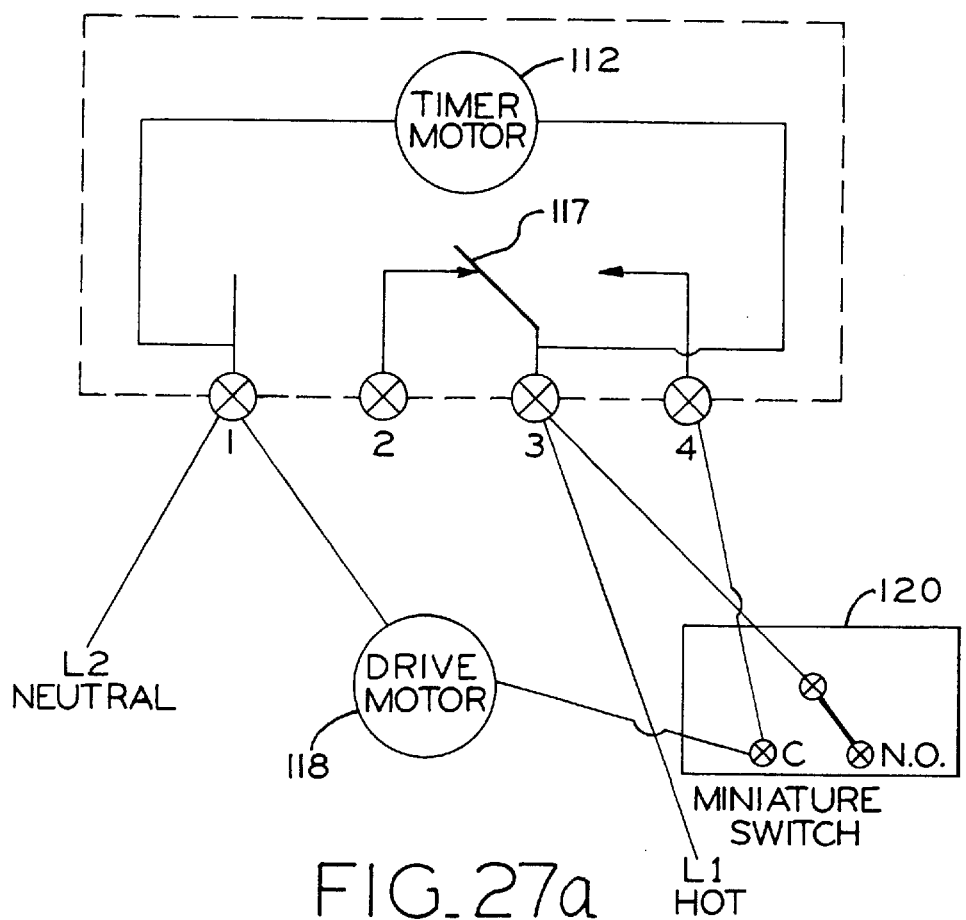
FIG_27a

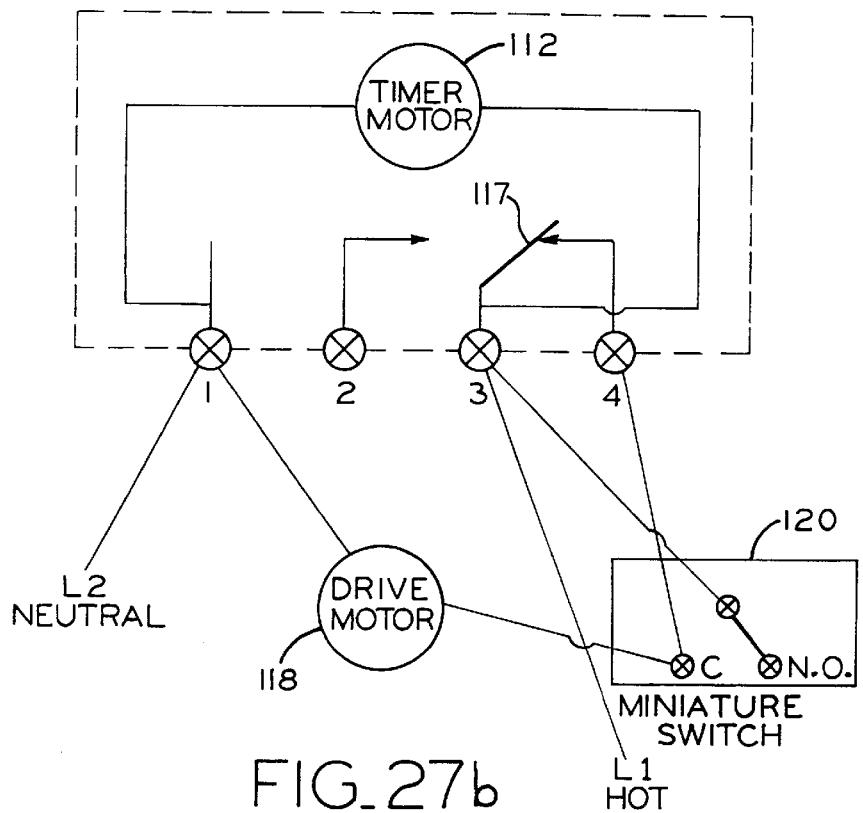
FIG_27b
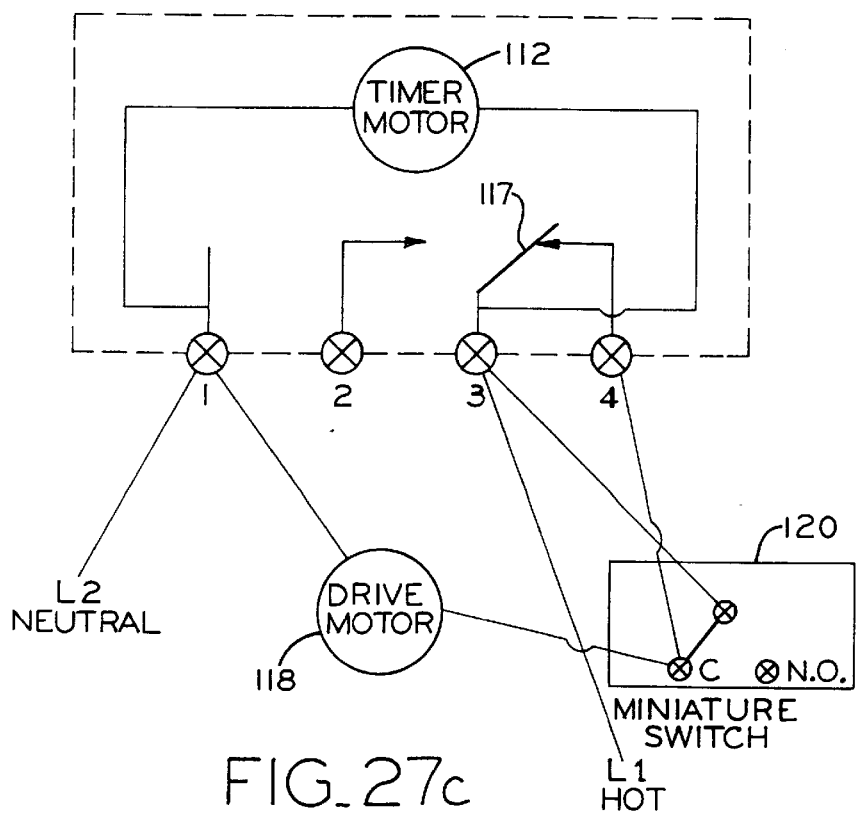
FIG_27c

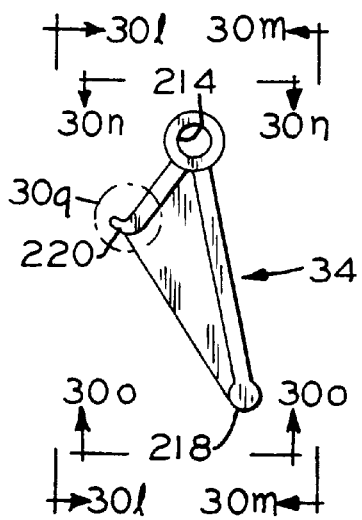
FIG_30d
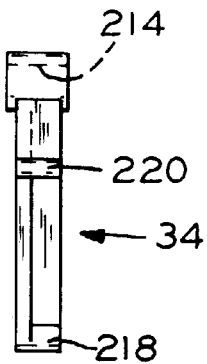
FIG_30e
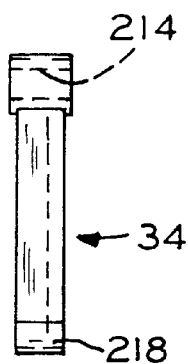
FIG_30f
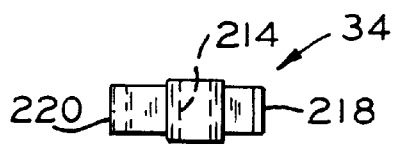
FIG_30g
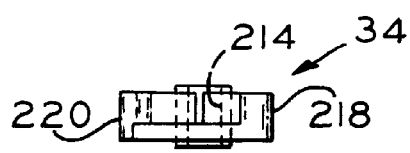
FIG_30h
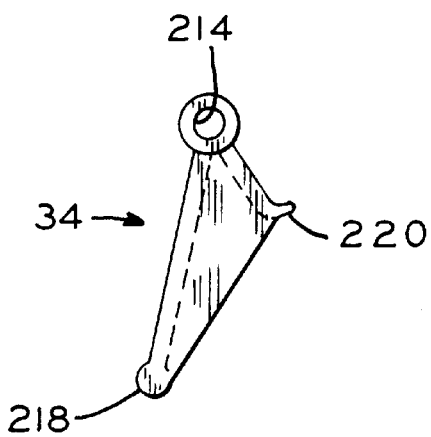
FIG_30i
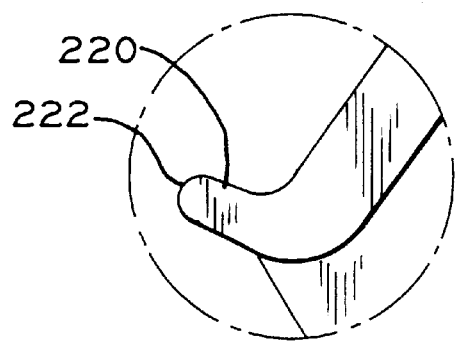
FIG_30j

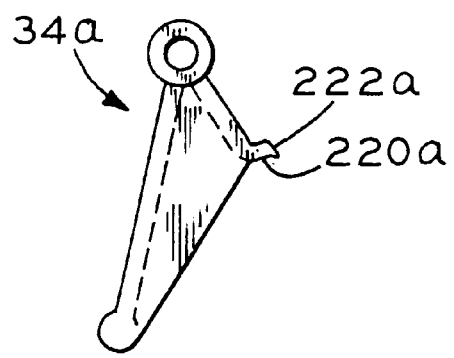
FIG_31a
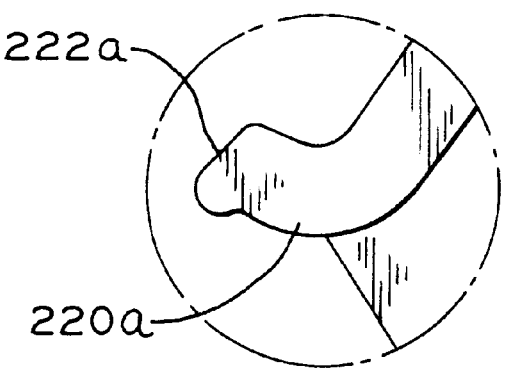
FIG_31b
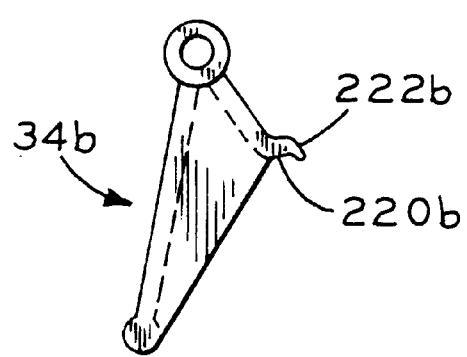
FIG_32a
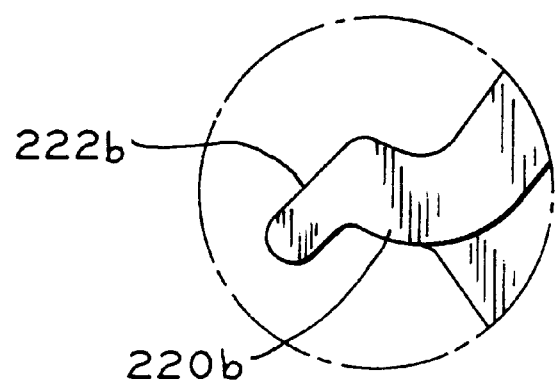
FIG_32b

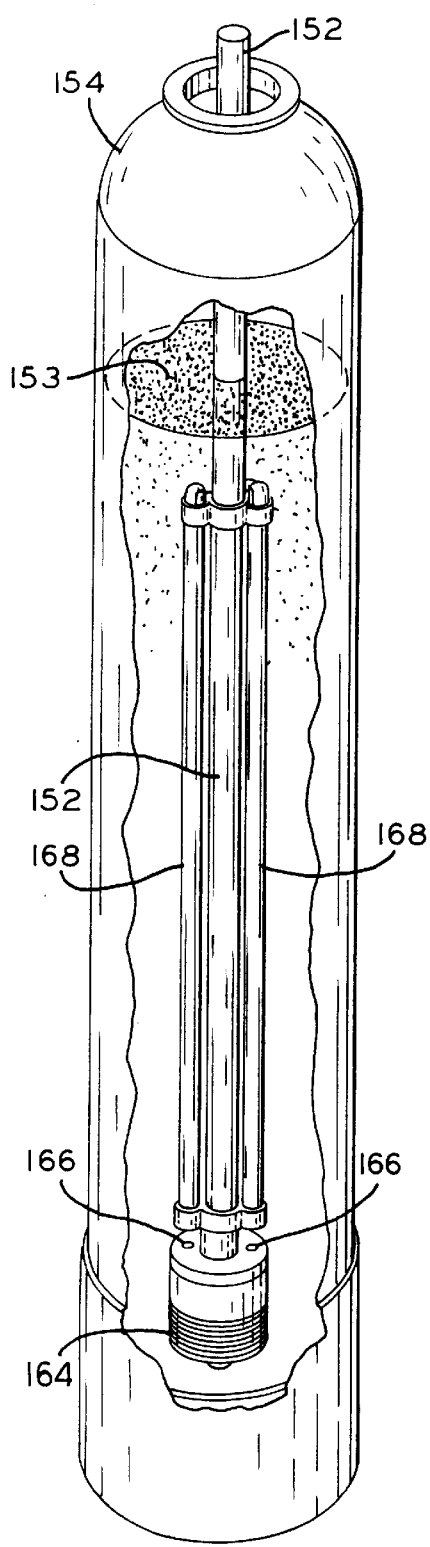
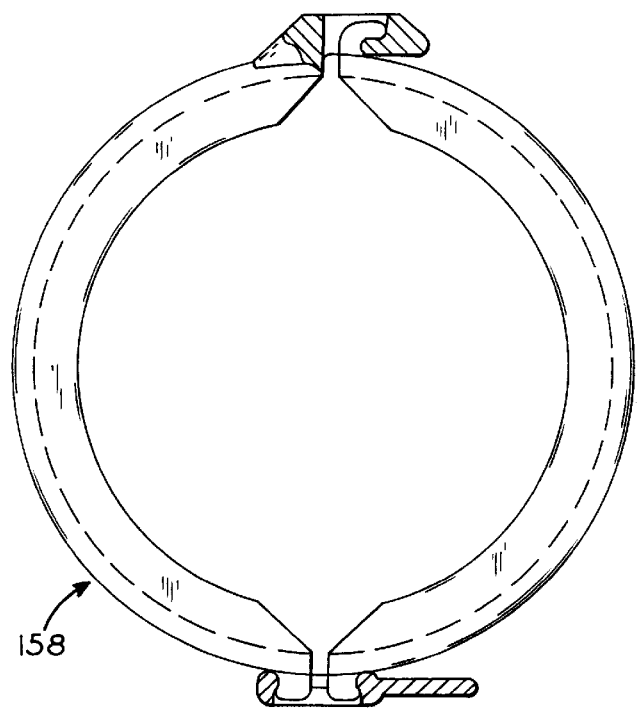
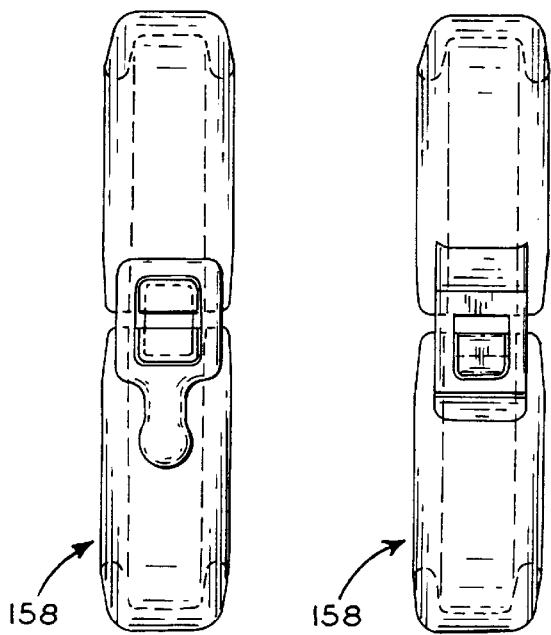
FIG. 33
FIG. 34
FIG. 35   FIG. 36

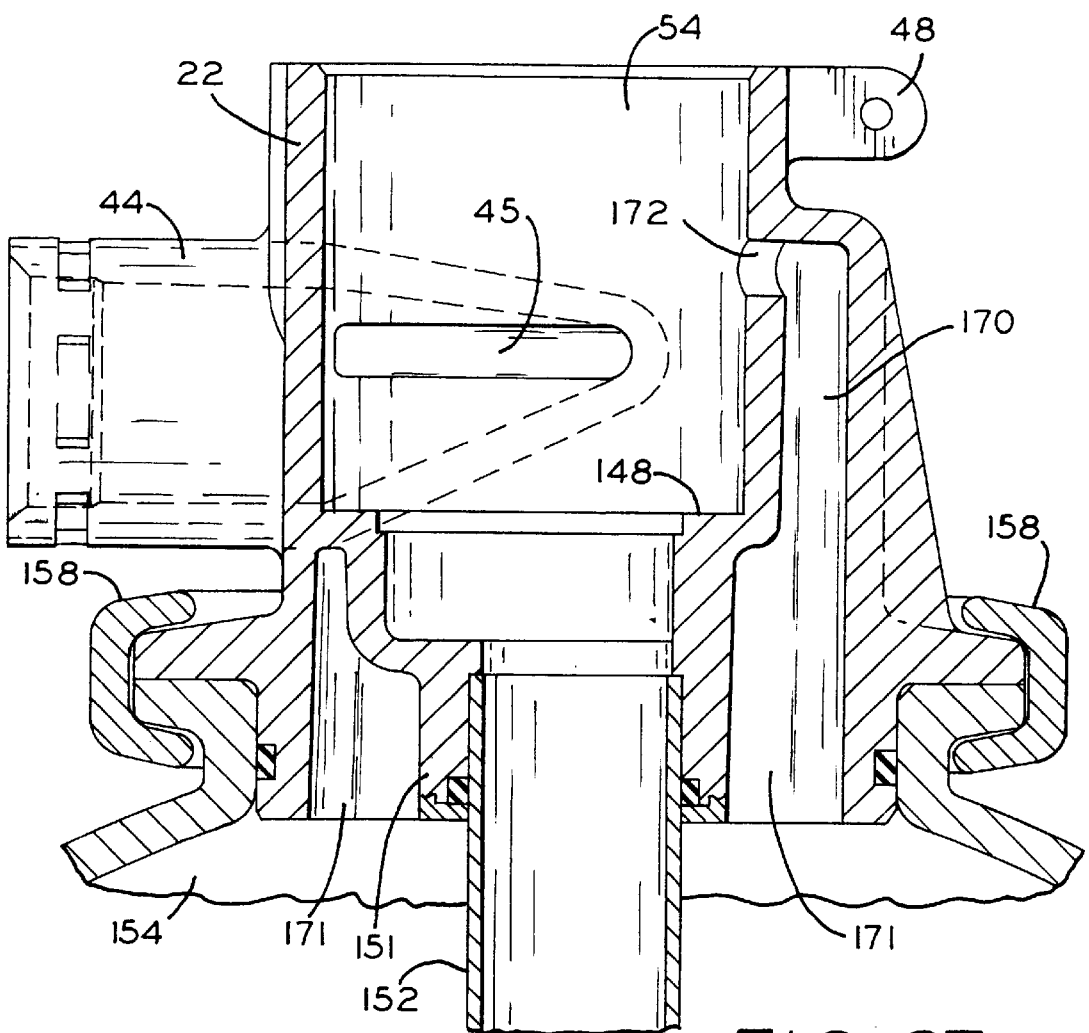
FIG_37
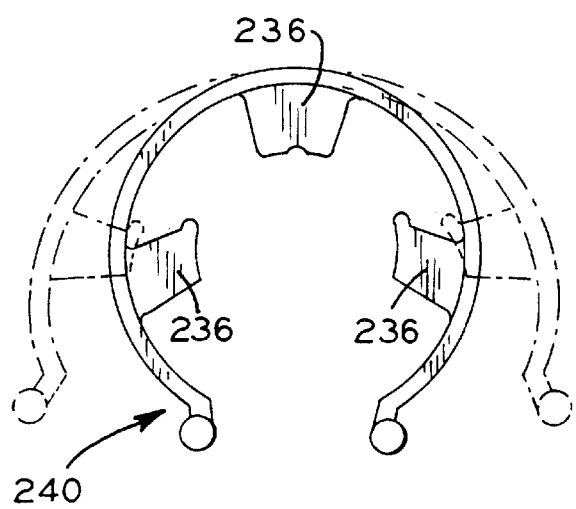
FIG_38

MODULAR CONTROL APPARATUS FOR WATER TREATMENT SYSTEM

This application claims benefit of Provisional application Ser. No. 60/077,034, filed Mar. 6, 1998.

BACKGROUND OF THE INVENTION

1. Field of the Invention

The present invention relates to water treatment systems, and more particularly to the control assemblies used to regulate the operation of such systems.

2. Description of the Related Art

Water treatment systems conventionally include tanks that are used to hold media through which water is directed for treatment. A common water treatment method involves the use of a resin material such as polystyrene divinyl benzene to form small beads which act as a replenishable ion exchange medium. For example, the beads, or media, may be used to exchange sodium ions for calcium and magnesium ions and, after the sodium ions attached to the media have been depleted (being replaced by calcium or magnesium ions), a brinish solution containing sodium is used to exchange the calcium and magesium ions on the media for sodium ions. The media may, alternatively, be utilized in a different ion exchange process and be replenished with an appropriate ionic solution.

Typically, the media is held in a water treatment tank and untreated water is introduced into the tank near its upper end. A center tube is vertically disposed in the tank and withdraws water from near the bottom of the tank. Thus, the untreated water passes through the media held in the tank, ensuring contact between the media and the water and, therefore, treatment of the water.

After the media has been depleted a regeneration cycle is required and typically includes a cleansing backwash cycle prior to the introduction of an ionic solution into the tank to replenish the media. During the normal operations of the tank, the media bed can become compacted as the media beads settle towards the bottom of the tank. It is also possible that bridging can occur in the media bed; this is an undesirable process by which the untreated water entering the tank creates small channels in the media bed leading to the center tube inlet. During the backwash cycle a fluid, such as untreated water, is introduced into the tank through the center tube and then flows upward through the media bed, lifting the media bed counteracting the settling and bridging which has occurred and removing any debris that may have accumulated in the bed.

After the backwash cycle is complete, the brinish solution is introduced into the tank to recharge the media. The brine tank is typically refilled with water after the brining phase of the regeneration cycle is completed. A rinsing cycle which resettles the media within the tank and flushes the brinish solution from the tank is also often used near the completion of the regeneration cycle.

A control valve assembly is typically located on the top of the tank holding the media and is used to regulate the flow of fluid through the tank. These assemblies may include a motorized timer and mechanical gears or a circuit board to regulate the opening and closing of the appropriate valves.

U.S. Pat. No. 3,616,820 (Fleckenstein) discloses a valve body having inlet, outlet, drain, tank connecting and brining passages therein. A slidable piston is disposed in the valve body and is movable to various positions within the valve body to connect the passages for normal service such as backwashing, regeneration, and brine tank filling. The piston is driven by a drive motor, and a crank is operable by the motor for shifting the piston through the various positions. The drive motor, timing motor and switch are mounted in a housing which is attached to the valve body. The disadvantage of such an arrangement is that the various components are difficult to access and service.

SUMMARY OF THE INVENTION

The present invention provides a modular water treatment control apparatus which is well-adapted for residential use. The control apparatus has a modular design which provides for the efficient manufacture and repair of the unit. The control apparatus also includes a housing which provides convenient access to the various parts and modules which form the control apparatus.

The present invention comprises, in one form thereof, a modular control apparatus for use in a water treatment system. The apparatus comprises a housing member having a valve body attached thereto. The valve body is adapted for installation on and fluid communication with a water treatment tank. The valve body defines a central opening, and a valve cartridge is disposed in the central opening. The valve cartridge includes a movable valve member therein. A drive mechanism is operatively connected to the movable valve member, and a drive motor module is mounted in the housing. The drive motor module drives the drive mechanism. A first timer module is mounted in the housing member and is removable from the housing member as a unit. The first timer module selectively provides electrical power to the drive motor at a first predetermined interval and thereby initiates a regeneration cycle.

In a preferred form thereof, the invention further comprises a second timer module which is interchangeable with the first timer module. The second timer module selectively provides the electrical power at a second predetermined interval and thereby initiates the regeneration cycle. The second predetermined interval is different in duration from the first predetermined interval. Thus, interchanging the first and second timer modules changes the frequency at which regeneration of the water treatment tank occurs.

The timer module is pre-set to actuate the drive motor, and hence actuate a regeneration cycle, at a predetermined interval, e.g., once every one, two or three days. The timer module is not adjustable, and the appropriate interval between regeneration cycles is chosen when the unit is first installed by selecting that timer module which corresponds to the desired interval. If it is later desired to the change the interval, the timer module is removed and a new module having the desired interval is installed.

In another preferred form, the apparatus further comprises a brine valve module attached to the valve body. The brine valve module is adapted to provide selective fluid communication between the valve body and a brine tank. Conveniently, the brine valve module is removable from the valve body as a unit. Additionally, the brine valve module further includes a sealing module. The sealing module is operatively connected to the drive mechanism to provide selective sealing of a brine tank line. Conveniently, the sealing module is also removable from the brine valve module as a unit.

In yet another preferred form, the drive motor module comprises a drive motor and a switch, both of which are mounted on a plate which is mounted in the housing member. Thus, the switch and the drive motor are removable from the housing as a unit. The switch is electrically connected to the drive motor and is adapted for electrical connection to an electrical power source, such as a wall outlet. Movement of the drive mechanism opens and closes the switch as the drive gear rotates, and correspondingly opens and closes the electrical connection from the power source to the drive motor.

In another preferred form, the present invention provides a convenient mechanism for adjusting the amount of brine used to replenish the media in the water treatment tank. The apparatus comprises a brine tank line in fluid communication with the valve body. A sealing module associated with the brine tank line selectively opens and closes the brine tank line from the valve body. The drive mechanism includes a camming element thereon. A first lever is removably and pivotally mounted in the housing member, and a camming element engages a first distal surface of the first lever as the drive gear rotates. In this manner, the lever is biased against the sealing module and opens the sealing module. During this time, water is allowed to pass through the brine tank line and into the brine tank. An adjustable engagement means is provided for changing the length of time the sealing module remains open as the drive mechanism rotates. In one preferred form, the adjustable engagement means comprises a second lever interchangeable with the first lever. The second lever has a second distal surface having greater transverse length than the first distal surface. Thus, the camming element engages the second distal surface for a greater duration than the first distal surface. Further, the second lever biases the sealing module open for a longer time than the first lever. The first and second levers are color coated to clearly distinguish between them.

In another form thereof the present invention comprises a modular control apparatus for use in a water treatment system. The apparatus comprises a valve body adapted for installation on and fluid communication with a water treatment tank. The valve body includes an inlet for receiving untreated water, a brine tank line adapted for communication with a brine source and a drain passage for dispensing waste water. The valve body defines a central opening. A housing member is pivotally attached to the valve body. The housing member is pivotable between a use position in which the housing member is positioned when the water treatment system is being used and an access position in which the housing member is positioned during servicing thereof.

In a preferred form, at least one fastener secures the housing member to the valve body when the housing member is positioned in the use position. The drive mechanism comprises a drive gear rotatably mounted in the housing member, and a piston is reciprocably disposed within the valve body. The piston is operatively connected to the drive gear when the housing member is positioned in the use position. Thus, in the use position, rotation of the drive gear produces reciprocation of the piston. On the other hand, when the housing member is tilted to the access position, the piston is disconnected from the drive gear.

Conveniently, the drive motor and timer module are mounted on the rear face of the housing member, and the rear face is oriented upwardly and forwardly of the water treatment system in the access position. Such a configuration exposes the timer module and the drive motor for access and servicing thereof.

The valve body includes a central opening which is accessible when the housing member is pivoted forward. A valve cartridge is inserted into the central opening, and includes a moveable valve member, reciprocation of which selectively opens various passages within the valve body.

Advantageously, if the valve cartridge assembly needed to be repaired, it can be easily removed as a unit and a new cartridge installed to complete the repair. The seals are located on the valve cartridge so that when the new cartridge is installed new seals are also installed. Alternatively, the old cartridge could be removed as a unit, repaired, and then re-installed as a unit. Such repairs are likely to require less time than performing similar repairs on a conventional non-modular system which does not include an easily removable valve cartridge.

Another advantage of the present invention is that it enables a homeowner to perform more repairs on the control valve assembly by simply removing and replacing one of the modules. The valve assembly is designed so that only a minimal number of fasteners need to be removed to gain access to the valve cartridge or remove one of the other modules, such as the timer module, for example. These features of the control apparatus lessen the dependence of the homeowner upon the repair services of professional technicians. Additionally, the control apparatus utilizes a 24 volt system instead of a 115 volt system, thereby lessening the risk of injury when servicing the assembly.

Another advantage of the present invention is that the individual modules can be replaced to alter the operating characteristics of the system. For example, to alter the interval between regeneration cycles, the timer module can be removed and replaced with a timer module having a different interval. The use of a timer module which has a fixed interval will generally be less expensive than a timer with an adjustable interval thereby reducing the cost of the system. The modular and simplified design of the present invention can also reduce the cost of maintaining the system and increases the reliability of the system.

Another advantage of the present invention is that it facilitates the efficient manufacture of different types of control assemblies, e.g., electronic timer control assemblies and filter tank control assemblies, by incorporating many of the modules into several different product lines.

Another advantage of the present invention is its "user-friendly" housing. The housing includes an L-shaped housing member which is hinged to pivot downward and provide access to the control assembly from the front of the system. This feature can be quite advantageous for residential water treatment systems which are often located against a wall in relatively cramped and poorly lit basement spaces.

Another advantageous feature of the disclosed control apparatus is its manual control knob which not only indicates which phase of the regeneration cycle the system is undergoing, but also permits the control system to be manually stepped through the treatment process. This feature allows the water treatment system to be used when the water supply is available but the electrical power is temporarily unavailable. Additionally, there are communities which desire residential water treatment systems which do not require electrical power, and the manual control knob provides the disclosed embodiment with the ability to function without electrical power.

Another advantage of the disclosed modular control apparatus is its utilization of color coded brine valve levers. Interchanging the differently configured and colored levers allows the quantity of the brine solution used in a regeneration cycle to be altered. The levers are easily interchanged by a homeowner and the different colors provide a convenient mechanism for distinguishing the differently configured levers which each provide a different pre-determined quantity of brine solution.

The modular design of the disclosed control valve assembly and the avoidance of excessively complicated control mechanisms provides a reliable, economical and easily maintained system for regulating a residential water treatment system.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a perspective view of the valve body and the front housing member with the front housing member pivoted forward.

FIG. 3a is an enlarged fragmentary perspective view showing an alternate mechanism by which the housing member is detachably secured to the valve body.

FIG. 4 is a side view of the valve body with the front housing member in a use position.

FIG. 5 is a side view of the valve body with the front housing member pivoted forward to an access position.

FIG. 6 is a side view of a cover which encloses the housing member.

FIG. 7 is an elevational view of the interior surface of the cover.

FIG. 8 is a side view of an elbow fitting.

FIG. 9 is a rear view of the valve body.

FIG. 10 is a cross-sectional view of the valve body taken through line 10—10 of FIG. 9.

FIG. 15 is an exploded perspective view of the valve cartridge.

FIG. 16 is a side view of the valve cartridge spool and guide.

FIG. 17 is a cross-sectional view of the brine valve module with the sealing module in a closed position.

FIG. 18 is a cross-sectional view of the brine valve module with the sealing module in an open position.

FIG. 19 is a cross-sectional view of the brine valve module through the loop.

FIG. 20 is cross-sectional view through both the brine valve module and the drain line opening.

FIG. 26 is a bottom view of the brine valve module.

FIGS. 27a–27e are schematic illustrations of the wiring system of the control valve assembly.

FIGS. 30d–30j contain several views of a lever designed to provide a four minute brine refill setting.

FIGS. 31a and 31b contain views of a lever designed to provide a six minute brine refill setting.

FIGS. 32a and 32b contain views of a lever designed to provide an eight minute brine refill setting.

FIG. 33 is partial break away perspective view of a water treatment tank to which the control valve assembly of FIG. 1 may be attached.

FIG. 34 is a partially cross-sectional view of a collar assembly which can be used to attach the control valve assembly of FIG. 1 to a water treatment tank.

FIG. 35 is a side view of the collar assembly of FIG. 34 showing the latch member.

FIG. 36 is a side view of the collar assembly of FIG. 34 showing the mating ends of the two collar pieces.

FIG. 37 is a cross-sectional view of the collar assembly of FIG. 34 attaching a valve body to a water treatment tank.

FIG. 38 is a view of a clip which can be used to attach an insert to either the inlet or outlet of the control valve assembly.

Figure 1:
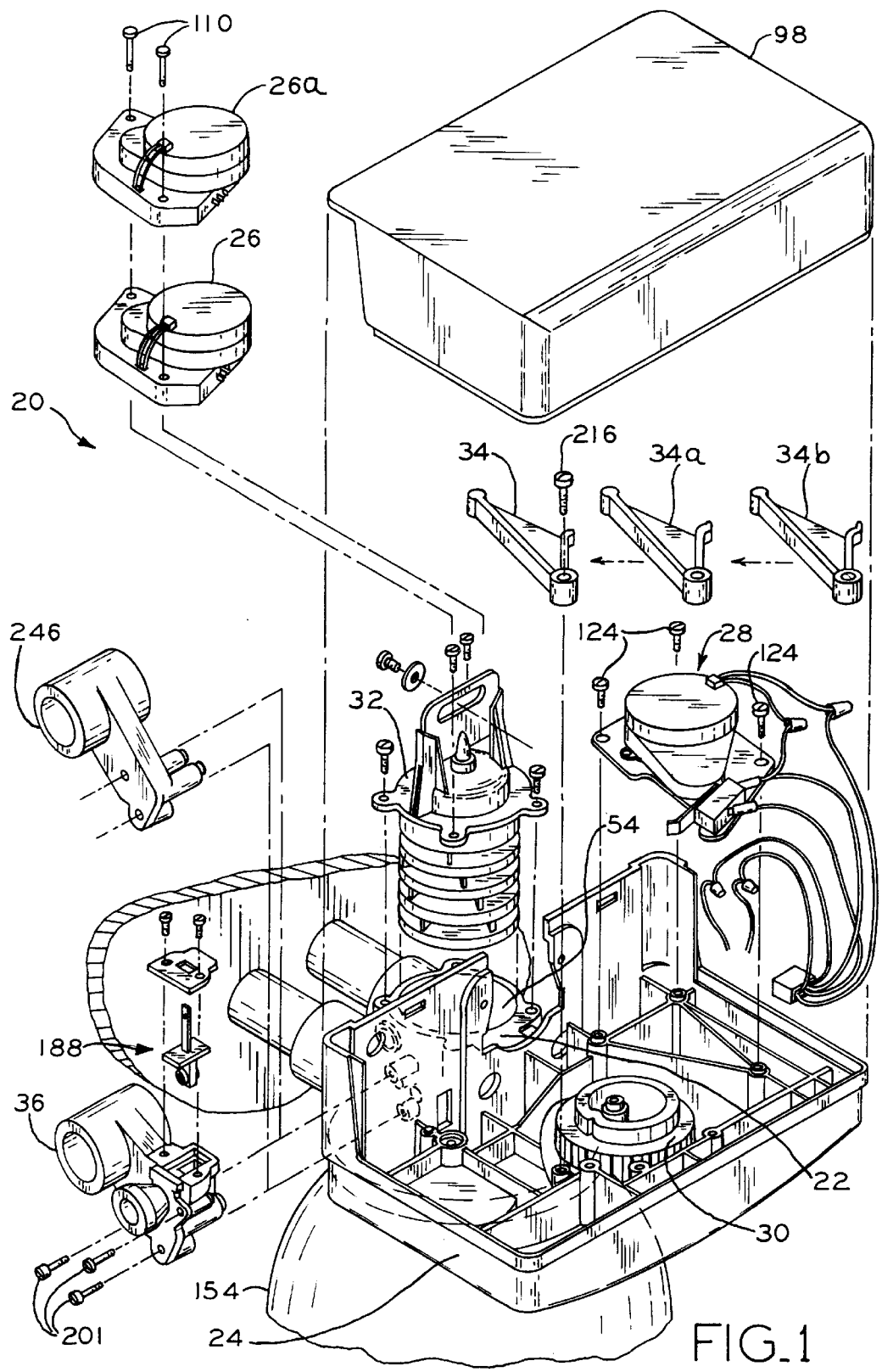
FIG. 1 is an exploded perspective view of a modular control apparatus embodying the present invention.

Corresponding reference characters indicate corresponding parts throughout the several views. Although the drawings represent an embodiment of the present invention, the drawings are not necessarily to scale and certain features may be exaggerated. The embodiment described below is set out as an exemplification of the invention. The described embodiment is not intended to be exhaustive or to be construed as limiting the scope of the invention to the precise form disclosed.

DESCRIPTION OF THE PRESENT INVENTION

A modular control apparatus 20 which exemplifies the present invention is illustrated in FIG. 1. The major components of apparatus 20 illustrated in FIG. 1 include valve body 22, front housing member 24, interchangeable timer modules 26, 26a, drive motor module 28, drive mechanism 30, a valve element in the form of valve cartridge 32, interchangeable brine valve levers 34, 34a, 34b, brine valve module 36 (which is interchangeable with filter plug 246), and brine line sealing module 188.

Figure 2:
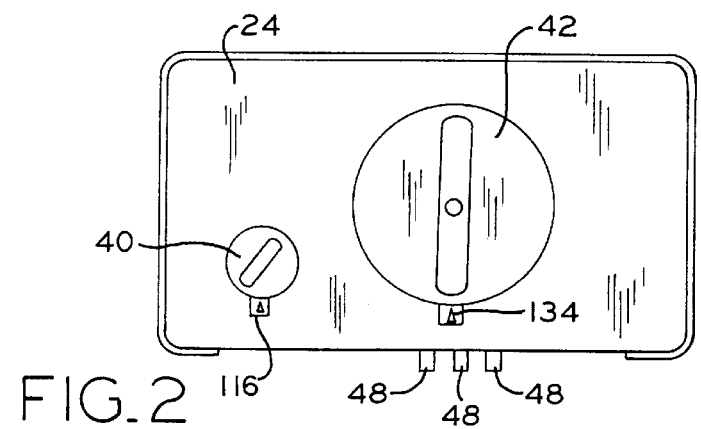
FIG. 2 is a front elevational view of the front housing member.
Figure 11:
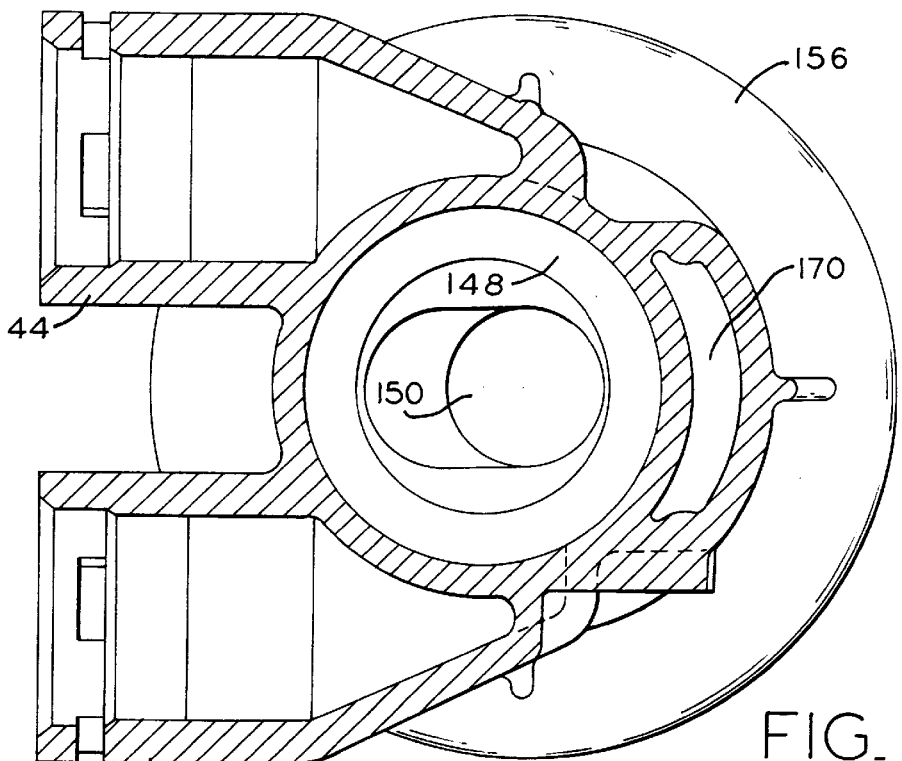
FIG. 11 is a cross-sectional view of the valve body taken through line 11—11 of FIG. 9.

The front face of front housing member 24, as well as timer knob 40 and manual control knob 42 are shown in FIG. 2. (As used herein, the "front" or "forward" side of apparatus 20 corresponds to the face of housing member 24 which includes knobs 40, 42, i.e., the user interface elements of the assembly, and the "rear side" 25 of the assembly corresponds to side of the assembly which includes inlet 44 and outlet 46 which must be connected to water lines which are often located in or adjacent a wall.) Front housing member 24 may be pivoted forward (relative to the water treatment tank) to provide access to the interior of valve body 22 and housing member 24 from the front side of apparatus 20 as best seen in FIGS. 3–5. The forward direction is typically away from the wall against which the treatment tank is placed. Front housing member 24 is pivotally attached to valve body 22 with a hinge assembly which includes three spaced lugs 48 extending from front housing member 24 which cooperate with two lugs 50 disposed on valve body 22. When placed in cooperative engagement, lugs 48, 50 have aligned bores through which a pivot pin 52 is inserted. In the illustrated embodiment, pivot pin 52 includes an enlarged, knurled end to lock pivot pin 52 in place. However, it is to be understood that a screw or other fastener could be used in place of pivot pin 52.

As can be seen in FIG. 3, valve body 22 includes a central opening 54 which is accessible when front housing member 24 is pivoted forward. Valve cartridge 32 is insertable into opening 54 as can be seen in FIG. 1. Cartridge 32 is shown in a highly schematic exploded view in FIG. 15 and includes a moveable valve member, or piston 56, a spool member 58, a mounting plate and guide member 60, and a slotted plate member 62. Spool member 58 is made of several individual segments which are threadingly engaged to each other and to mounting plate member 60. A threaded recess 64 on the upper surface of spool member 58 is shown in FIG. 15 and a threaded extension 66 on the lower surface of spool member 58 is shown in FIG. 16. While the exemplary embodiment shown and described herein depicts a reciprocable piston 56, it is to be understood that one of ordinary skill in the art could substitute other moveable valve members for piston 56, such as a rotating valve member for use with a differently configured cartridge, for example. Such departures from the illustrated embodiment are within the scope of the present invention.

As best seen in FIG. 16, spool member 58 includes several annular disks 68 which include recesses 70 on their outer perimeter for receiving O-ring seals (not pictured). Column elements 72 separate the annular disks 68. The interior perimeter of the donut-shaped disks 68 also includes recesses for receiving a seal member. The seals located on the exterior perimeter of spool member 58 engage the interior surface of opening 54 while the seals located on the interior perimeter engage piston 56.

Movement of piston 56 relative to spool member 58 controls the fluid connections within valve body 22 as described in greater detail below. Piston 56 is made of brass with a polytetrafluoroethylene coating in the illustrated embodiment. Piston 56 may also be made of other materials and it is envisioned that piston 56 may be manufactured of a plastic material and thereby eliminate the need to use a secondary coating on piston 56. Piston 56 is attached to rod 76 which extends from slotted plate member 62 (FIG. 15). The outer edges of the flat plate portion of flat plate member 62 are received in slots 78 located in the guide columns 80 located on mounting plate member 60. When installed, an eccentrically located boss 82 (FIGS. 1a and 40) projecting from drive mechanism 30 (a drive gear in the illustrated embodiment) is disposed within camming slot 84. Rotation of drive mechanism 30 thereby causes plate member 62 to reciprocate vertically within slots 78 as boss 82 moves in a circular path about the axis of drive mechanism 30. Piston 56, attached to rod 76, is thereby caused to reciprocate vertically within spool member 58. While the drive mechanism 30 of the exemplary embodiment is shown and described as a drive gear including an eccentrically mounted boss which reciprocates piston 56, it is to be understood that one of ordinary skill in the art could substitute other drive mechanisms which can be operatively connected to a moveable valve member.

When assembled together, spool member 58, mounting plate member 60, slotted plate member 62, piston 56 and the associated seals form a valve cartridge unit 32. Valve cartridge 32 can then be installed or removed from valve body 22 as a single modular unit. To install valve cartridge 32, the cartridge is inserted into opening 54 while front housing member 24 is pivoted forward. Valve cartridge 32 is then secured to valve body 22 as discussed below.

Mounting plate 60 has four outwardly extending ears 86 having bore holes 88. To secure valve cartridge 32 to valve body 22, bore holes 88 are aligned with interiorly threaded metal inserts 90a, 90b (FIG. 3) disposed adjacent opening 54 on the upper surface of valve body 22. Threaded fasteners 95 (FIG. 5) are inserted through the two forward bore holes 88 to threadingly engage forward metal inserts 90a. Front housing member 24 is then rotated rearwardly to an upright position. When rotated to an upright position, recess 96 in the bottom surface of front housing member 24 receives the bottom mounting plate portion of mounting plate member 60. As best seen in FIG. 3, recess 96 also includes a cutout portion which permits front housing member 24 to be pivoted without being obstructed by an installed valve cartridge.

Large apertures 92 in front housing member 24 allow passage of the heads of threaded fasteners engaged with metal inserts 90a. Smaller apertures 94 are aligned with rear metal inserts 90b when front housing member 24 is rotated to its upright position. Threaded fasteners 94b are then inserted through apertures 94 and bores 88 to engage rear metal inserts 90b. Threaded fasteners 94b thereby not only secure valve cartridge 32 in place but also engage front housing member 24 and member 24 in an upright service position.

Cover 98 (FIGS. 1, 6 and 7) may be attached to front housing member 24 after fasteners 94b are installed. Cover 98 includes an outwardly extending lip 100 which is received in recess 102 on front housing member 24. Cover 98 also includes T-shaped reinforcing ribs 104 which provide rigidity to cover 98. The outer flange of ribs 104 forms an extension 106 at the lower end of ribs 104 (FIG. 6). Extensions 106 are insertable into mounting slots 108 (FIG. 3) located in front housing member 24. Additionally, the lower portions 101 of the cover side panels are seatable in shoulders 103 on front housing member 24. Engagement of extensions 106 and slots 108, cooperative engagement of lip 100 and recess 102, and engagement of lower side portions 101 with shoulders 103 secures cover 98 to front housing member 24. Thus, cover 98 can be secured to housing member 24 without using fasteners.

As shown in FIG. 7, cover 98 also includes two hollow cylindrical extensions 109. A brine valve lever can be attached to each cylindrical extension 109 with a threaded fastener when the lever is not being used. The reasons for having additional brine valve levers is discussed below.

To access modular control apparatus 20, housing member 24 must be pivoted from its "use position" shown in FIG. 4. To do so, cover 98 is removed and fasteners 94b are then removed as schematically illustrated in FIG. 4. Fastener 81 (FIG. 1a) is then removed to disengage eccentric boss 82 from slotted plate 62, which effectively disconnects piston 56 from its operative connection to drive mechanism (gear) 30. Front housing member 24 can then be pivoted forwardly as indicated by the arrows in FIG. 4 to the "access position" shown in FIG. 5. (The views of apparatus 20 depicted in FIGS. 4 and 5 are from opposite sides of apparatus 20.)

It is to be understood that the step of removing fasteners before pivoting housing member 24 could be eliminated. For example, with reference to FIG. 3a, flexible protrusions 90c could be configured to form an interference, or "snap fit" engagement with apertures 94. Thus, the alternate arrangement shown in FIG. 3a obviates the need for fasteners 94b. Similarly, inserts 90a could also be replaced with flexible protrusions such as those shown in FIG. 3a, whereby housing member 24 would be entirely removable without first requiring the removal of fasteners. Similarly, eccentric boss 82 could be configured to interference fit with slotted plate 62.

With front cover member 24 in the forwardly pivoted, or "access position" depicted in FIG. 5, the interior of cover member 24 as well as valve cartridge 32 is accessible from the front of apparatus 20. That is, rear face 25 is oriented upwardly and forwardly of the treatment system when housing member 24 is positioned in the access position. Drive motor module 28 and timer module 26 are thus exposed for removal thereof. Further, all that is necessary to remove valve cartridge 32 from apparatus 20 after rotating front cover member 24 to its access position (which exposes valve cartridge 32) is to remove threaded fasteners 95.

FIG. 1 illustrates the interrelationship of the timer module 26, the drive motor module 28, the drive mechanism 30, the brine valve lever 34 and the brine valve module 36. Timer module 26 is attached to the interior of front cover member 24 with two threaded fasteners 110. Electro-mechanical timer module 26 includes a motor 112 attached to housing 114. Housing 114 is, in turn, connected to front cover member 24 with threaded fasteners 110. A shaft (not shown) extends from housing 114 and projects through an aperture in front housing member 24 to engage knob 40. Housing 114 contains gears and electrical contacts which are configured to provide electrical power to the drive motor at a predetermined interval to initiate the regeneration cycle as described in greater detail below. As can be appreciated with reference to FIG. 1, timer module 26 can easily be interchanged with timer module 26a by simply removing fasteners 110, disconnecting wiring harness 111 and then removing timer module 26 from housing member 24 which is positioned in the access position. Wiring harness 111 can then be reconnected to timer module 26a, whereupon timer module 26a can be positioned in housing member 24 and fasteners 110 can be reinstalled.

With reference to FIG. 2, for timers having a one day interval between regeneration cycles, knob 40 completes a single rotation every 24 hours and has the hours of the day marked along its outer perimeter. By turning knob 40 so that indicator 116 points to the correct time of day, the regeneration cycle will be initiated at a preselected time of day (which may be printed on knob 40) when it is anticipated that there will be little, if any demand for water, e.g., 2 a.m. All that is required to adjust the time at which the regeneration cycle is started is to turn knob 40 (indicator 116 will no longer point to the correct time of day if this is done).

Timer module 26 is of an economical design so that the interval between regeneration cycles cannot easily be altered. Instead, interchangeable timer modules which selectively provide power to drive motor module 28 at different intervals are used to manufacture apparatuses 20. Thus, the frequency at which regeneration takes place is changed by interchanging timer modules. A timer module 26a (FIG. 1) with a different interval between regeneration cycles can be conveniently interchanged with the timer module 26 to alter the interval by removing knob 40, fasteners 110 and wiring harness 111. Then, module 26 is removed, wiring harness 111 is connected to module 26a, module 26a is attached to front cover member 24 with fasteners 110, and a new knob 40 with the appropriate markings is attached to the shaft of the new module.

As a general rule of conventional residential water treatment system design, if a regeneration cycle interval of more than three days is required, the water treatment tank is most likely oversized. Similarly, if a regeneration cycle interval of less than one day is required, the water treatment tank is most likely undersized. Thus, timer modules 26 or 26a having intervals of one (1), two (2), and three (3) days can be used to satisfy nearly all residential water treatment applications.

Figure 1A:
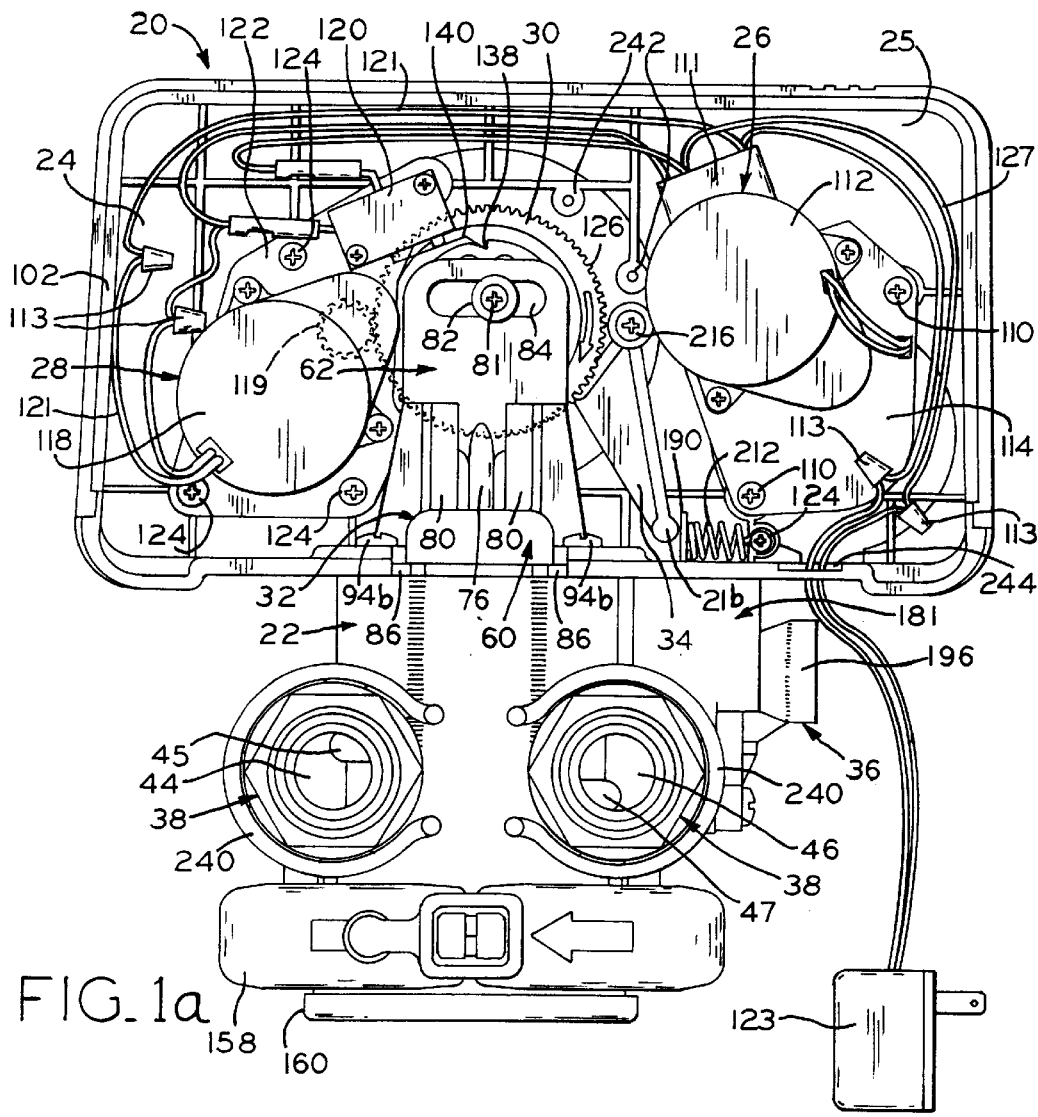
FIG. 1a is a rear elevational view of a modular control apparatus embodying the present invention with the rear housing member removed.

The drive motor module 28 which drives drive mechanism 130 is also illustrated in FIGS. 1 and 1a and includes a drive motor 118, a motor gear 119 which engages drive mechanism 130, a miniature switch 120 and a mounting plate 122. Drive motor 118 and switch 120 are attached to mounting plate 122, which in turn is secured to front cover member 24 with three threaded fasteners 124. Various electrical wires 121 as is known in the art supply electrical power to drive motor module 28. Wires 127 connect to 24-volt transformer 123, which in turn plugs into an electrical wall outlet. Wires 127 include wire nuts 113, "quick disconnects," or other suitable connectors which allow wires 127 to be disconnected from the 24-volt transformer.

Thus, to remove drive motor module 28 (which includes miniature switch 120), wire nuts 113 are removed, thereby freeing wires 121. Quick disconnects 115 are unplugged from miniature switch 120. Fasteners 124 are then removed from plate 122 and drive motor module 28 can then be removed from housing member 24 as a unit. To manufacture apparatus 20, drive motor 118 and switch 120 are attached to plate 122 using fasteners 124a (FIG. 1a) to form a drive motor module 28 before securing plate 122 to cover member 24 with fasteners 124. The assembly of drive motor modules 28 which can be subsequently attached to front cover member 24 facilitates the cost efficient manufacture of apparatus 20 and reduces the number of drive train components. If such is desired, drive motor 118 can be separately removed by removing fasteners 124a, instead of removing the entire module 28.

Figure 40:
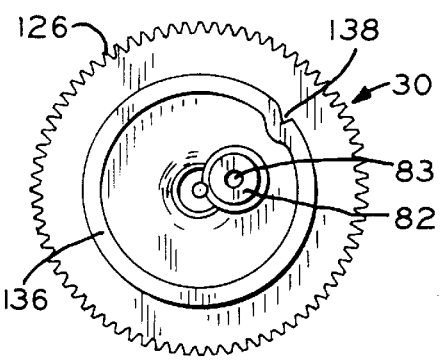
FIG. 40 is an end view of the drive gear looking at the end of the gear attached to the valve cartridge.
Figure 41:
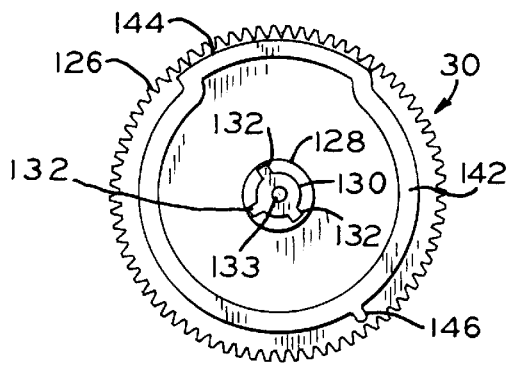
FIG. 41 is an end view of the drive gear looking at the end of the drive gear attached to the manual control knob.
Figure 39:
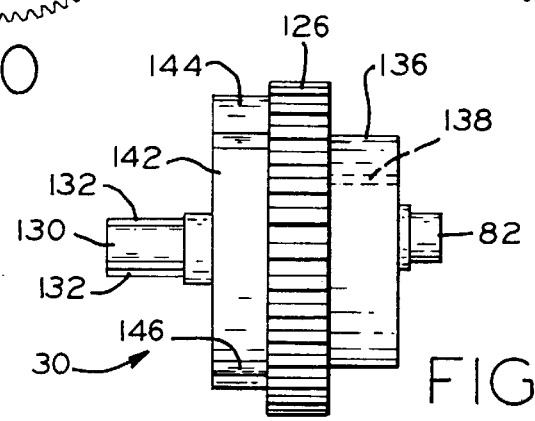
FIG. 39 is a side view of the drive gear.

Drive mechanism 30 is also illustrated in FIG. 1 and 1a and shown in greater detail in FIGS. 39–41. Drive mechanism 30 includes gear teeth 126 which are engaged by similar teeth on motor gear 119 which thereby rotates drive mechanism 30. An eccentrically located boss 82 extends from one side of drive mechanism 30 and travels in a circular path as drive mechanism 30 rotates. Boss 82 extends into slot 84 of slotted plate 62 (FIG. 1a).

Slotted plate 62 can move vertically but cannot move horizontally; thus, as boss 82 moves in a circular path, boss 82 moves horizontally with respect to plate 62 within slot 84 and causes slotted plate 62 to move vertically. Eccentric boss 82 includes a blind bore 83 which can be used to receive threaded fastener 81 (FIG. 1) and a washer to ensure that boss 82 does not disengage from slotted plate 62.

Figure 42:
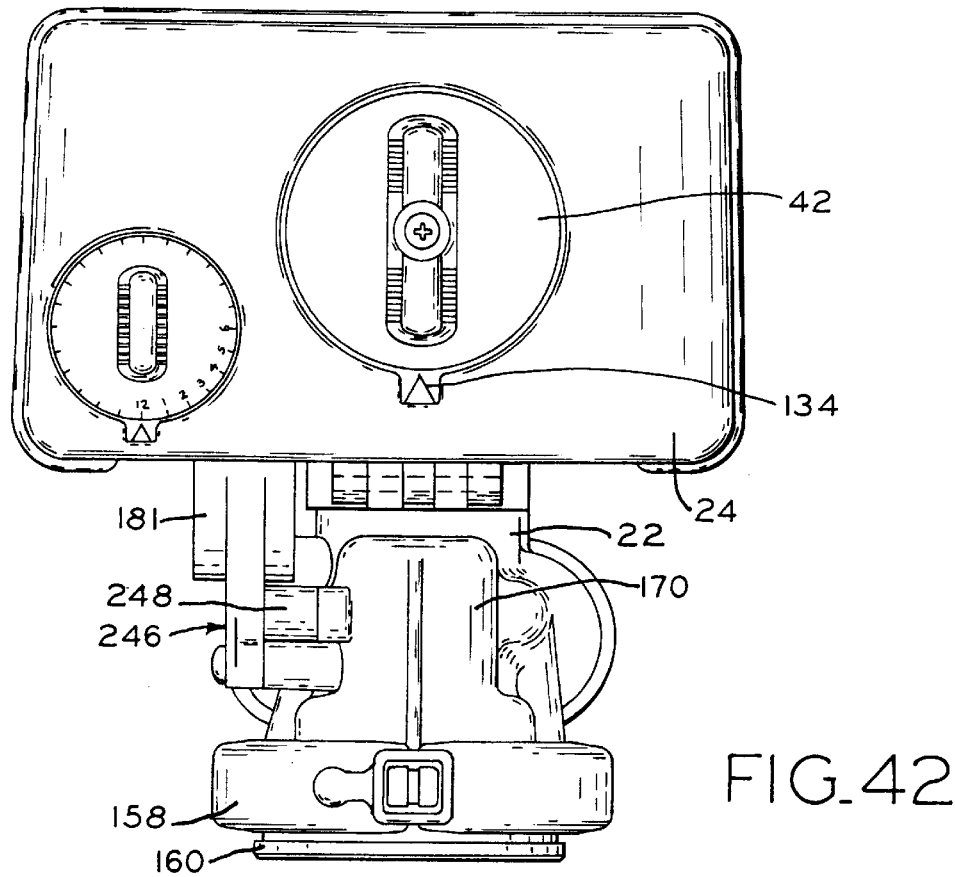
FIG. 42 is a front view of a control assembly for use with a filter tank.
Figure 43:
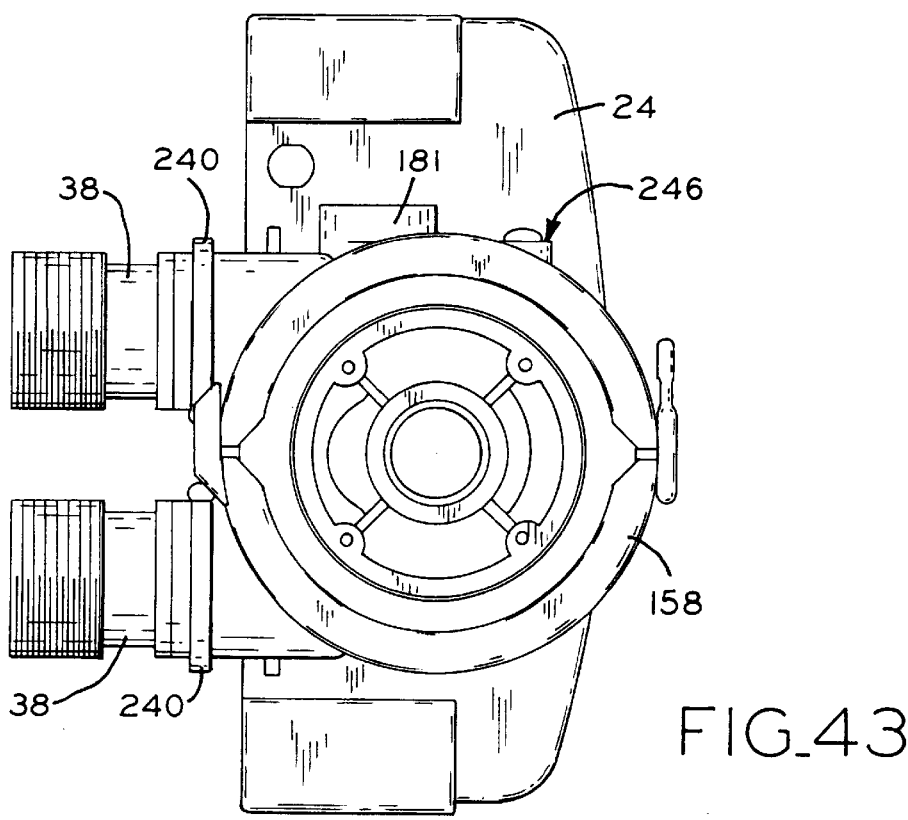
FIG. 43 is a bottom view of the filter tank control assembly.
Figure 44:
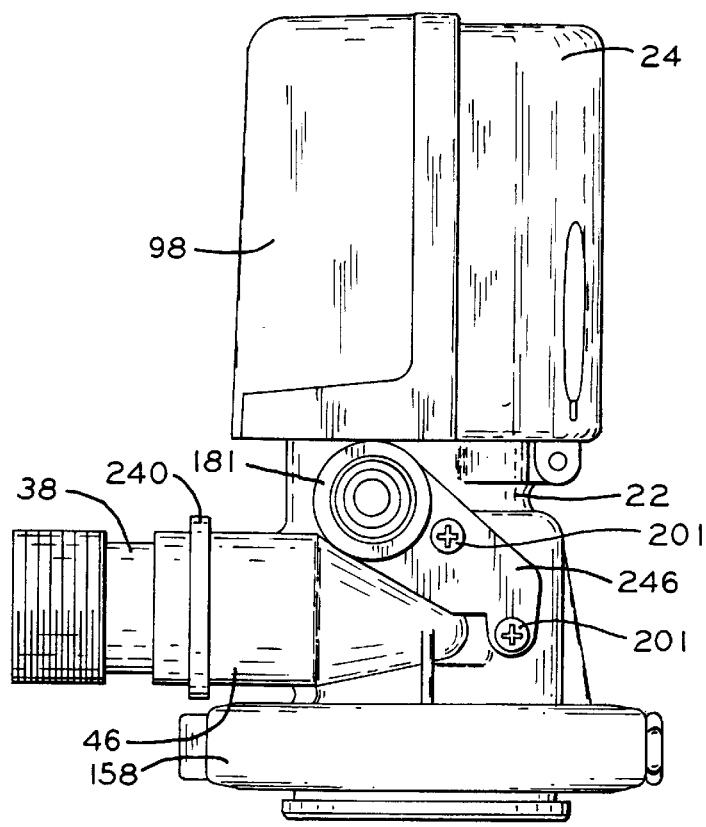
FIG. 44 is a side view of the filter tank control assembly.
Figure 45:
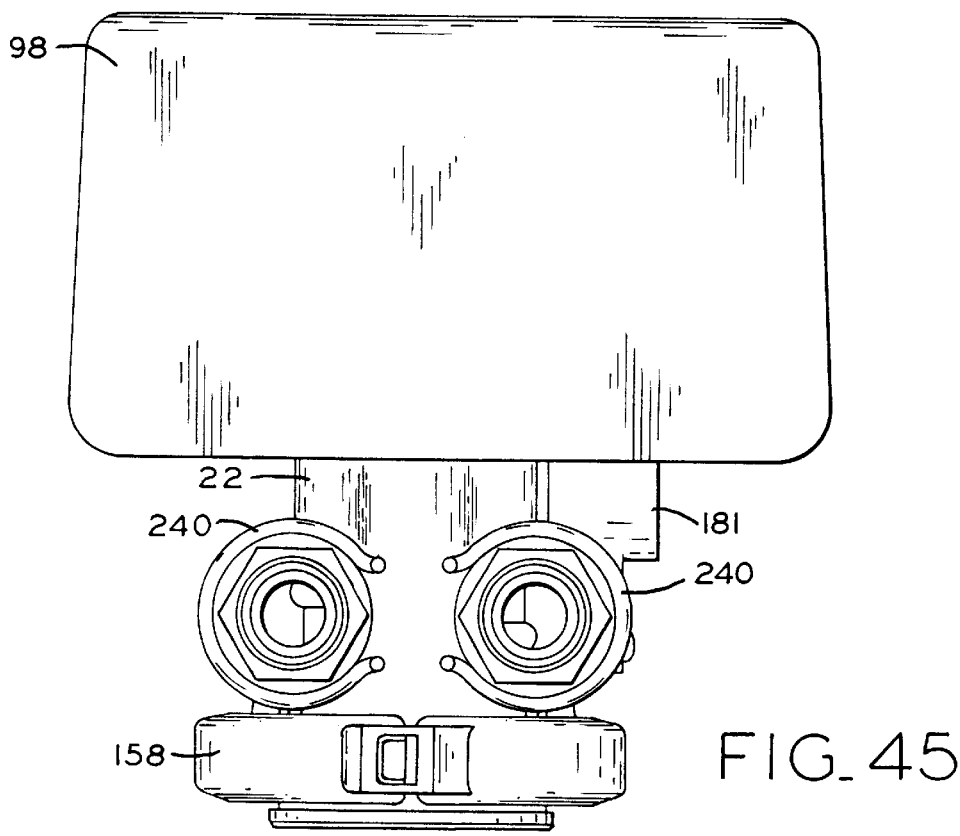
FIG. 45 is a rear view of the filter tank control assembly.

As shown in FIGS. 39 and 41, a second shaft 128 extends along the axis of drive mechanism 30. Shaft 128 is disposed within a bore in front cover member 24 and thereby bearingly supports drive mechanism 30. An extension 130 of shaft 128 includes ribs 132 which mate with recesses in knob 42 (FIGS. 2 and 42). Ribs 132 ensure that knob 42 is attached to shaft 128 in a predetermined rotational orientation. Knob 42 may thereby have the different phases of the regeneration cycle printed along the outer perimeter of knob 42 and indicator 134 (FIGS. 2 and 42) will indicate whether control apparatus 20 is in a service position or the specific phase of the regeneration cycle assembly 20 is positioned to generate. Knob 42 not only provides information about the current position of control apparatus 20 but also permits a user to manually change the position of the control assembly and thereby directly and manually control the operation of the water treatment system.

With further reference to FIGS. 1a, 39 and 40, drive mechanism 30 also includes a cylindrical portion 136 which has a switch recess 138. Switch arm 140 has an extension which is extendable into recess 138 as shown in FIG. 1a. When switch arm 140 is in the position shown in FIG. 1a, switch 120 is open, and as a result, power to the drive motor is broken and the motor is at rest. Control apparatus 20 is therefore in the service position. That is, the control assembly is positioned to treat water rather than positioned to cause a phase of the regeneration cycle when switch arm 140 is in the open position shown in FIG. 1a.

As noted above, the electrical power is supplied via wires 127 which are attached to a 24-volt step down transformer to operate the illustrated 24 volt system. Wires 127 are routed through aperture 244 (FIGS. 1 and 3) in front housing member 24. A ground wire may also be utilized; however, a ground wire is not required with a 24 volt system.

Figure 27D:
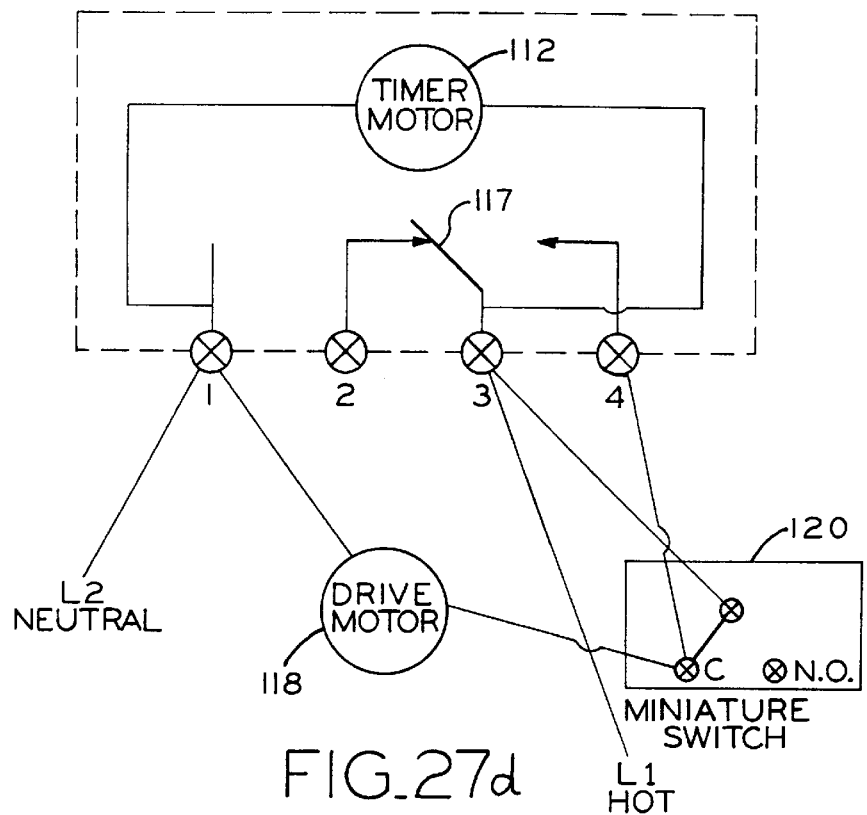

FIGS. 27a–e provide schematic wiring diagrams of the illustrated embodiment. The dashed outline with terminals 1–4 represents timer housing 114. FIG. 27a represents the system during the service cycle. During the service cycle, both the internal timer switch 117 and switch 120 are open and drive motor 118 is inactive. FIG. 27b represents the point at which the timer has just initiated the regeneration cycle, switch 120 is still open and timer module 26 provides electrical power directly to drive motor 118. Timer module 26 continues to directly provide electrical power to drive motor 118 during the initial stage of the regeneration cycle. During this initial stage of the regeneration cycle, drive mechanism 30 is rotated by drive motor 118 and switch arm 140 is displaced towards miniature switch 120 and closes switch 120.

Figure 27E:
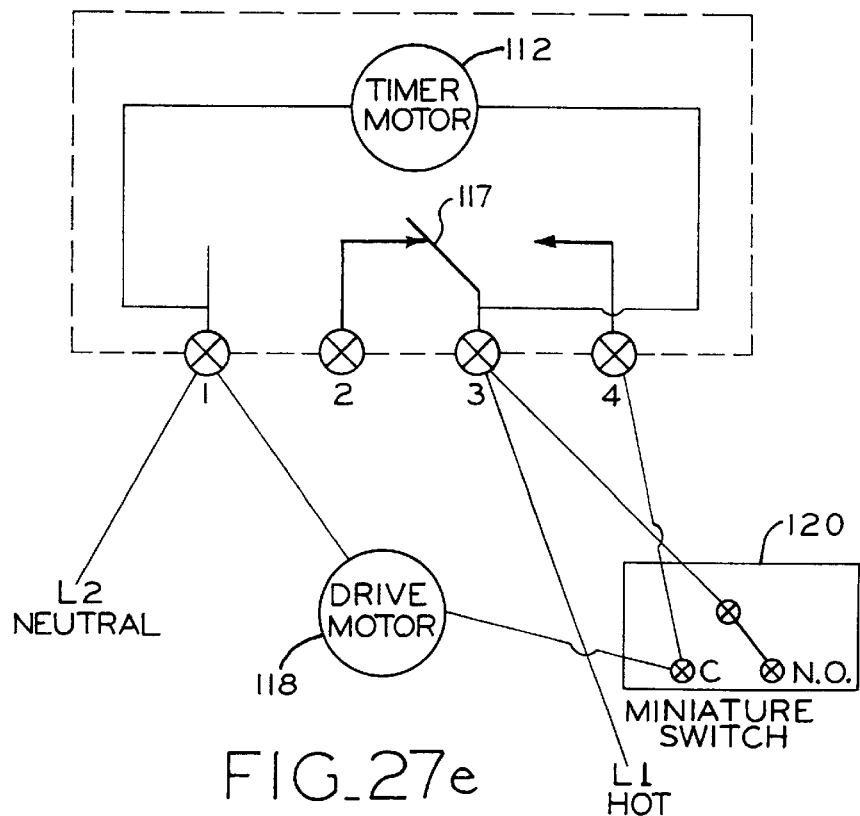

FIG. 27c illustrates a point at which the timer module still provides power to electrical motor 118 and recess 138 has rotated beyond switch arm 140 thereby closing switch 120. Timer module 26 is configured to open the circuit to drive motor 118 shortly after switch 120 closes whereafter drive motor 118 only receives power through switch 120 as illustrated in FIG. 27d. Drive motor 118 will continue to receive power and rotate drive mechanism 30 until drive mechanism 30 has made one complete revolution and switch arm 140 falls back into recess 138 thereby opening switch 120 and completing the regeneration cycle. FIG. 27e (as well as FIG. 27a) illustrates the point at which the drive gear has reached the service position and power is no longer being provided to drive motor 118. In the disclosed embodiment, the entire regeneration cycle, i.e., one complete rotation of drive mechanism 30, takes approximately 3 hours for a softener and about one and one-half hours for a filter.

As drive mechanism 30 is slowly rotated through one complete rotation without interruption, eccentric boss 82 is also rotated through one rotation thereby lowering and then raising slotted plate 62 and piston 56 relative to spool member 58 and valve body 22. This movement of piston 56 redirects the flow of water within valve body 22 and the water treatment tank to which valve body 22 is attached.

As shown in FIGS. 29a–d, drive mechanism 30 also controls the opening and closing of the bi-directional brine valve by cammingly engaging brine valve lever 34. Drive mechanism 30 includes a second cylindrical portion 142 having a raised brine draw camming element 144 and a raised brine refill camming element 146. As drive mechanism 30 rotates during the regeneration cycle, camming elements 144 and 146 bias lever 34 against sealing module 188 thereby opening the brine line 196 during the brine draw and brine tank refill phases of the regeneration cycle.

FIGS. 9–14 illustrate valve body 22 through which the flow of fluid is directed. Valve body 22 includes a central opening 54 which receives valve cartridge 32. When installed, the bottom surface of the lowermost disk 68 of valve cartridge 32 rests in part on annular ledge 148 of valve body 22. Opening 54 is in fluid communication with cylindrical opening 150 which is defined by inner cylindrical neck 151 which extends axially downward within valve body 22 and receives a center tube 152. Center tube 152 extends downwardly into treatment tank 154. Thus, opening 150 is in fluid communication with the tank interior near the bottom of tank 154 via the center tube assembly.

The center tube assembly extends into media beads 153 as seen in FIG. 33. During the service cycle, untreated water is introduced into tank 154 through inlet 44 and travels downward through media 153 whereby the water is treated and enters the center tube assembly through filter basket 164. The treated water then flows up center tube 152 and is discharged from valve body 22 through outlet 46.

During the backwash phase of the regeneration cycle, fluid is forced down the center tube 152. After entering filter basket 164, the backwash fluid is discharged through one-way valves 166. As the backwash fluid exits valves 166 it carries media beads 153 with it into side tubes 168 where it travels upwards and is discharged from the upper ends of side tubes 168. The center tube assembly illustrated in FIG. 33 is described in greater detail in the disclosure of U.S. patent application Ser. No. 08/959,420, filed Oct. 28, 1997, which is hereby incorporated by reference. Numerous additional center tube assemblies which perform filtering and backwash functions are well known in the art and can be used in place of the illustrated center tube assembly.

Valve body 22 includes a flange 156 which enables valve body 22 to be secured to a treatment tank 154 with clamping assembly 158. Clamping assembly 158 is shown in FIGS. 1 and 34–37. Valve assembly 22 also includes an axially extending cylindrical neck 160 having a groove 162 for receiving an O-ring seal (not shown) which sealingly engages both valve body 22 and water treatment tank 154. The use of clamping assembly 158 to secure a fitting having a flange, axially extending cylindrical neck and groove similar to that of valve body 22 to a water treatment tank 154 is illustrated in FIG. 37. The use of clamping assembly 158 is described in greater detail in the disclosure of U.S. Pat. No. 5,584,411 which is hereby incorporated by reference.

As can be seen from FIG. 9 and FIGS. 10–12 which illustrate cross-sectional views through inlet 44 and outlet 46 taken along lines 10—10, 11—11 and 12—12 of FIG. 9, openings 45 and 47 respectively interconnect inlet 44 and outlet 46 with central opening 54 in valve body 22. Openings 45 and 47 are located at different axial positions with opening 45 located above opening 47 whereby an annular disk 68 is positioned between openings 45 and 47 as can be seen in FIG. 28a.

Figure 13:
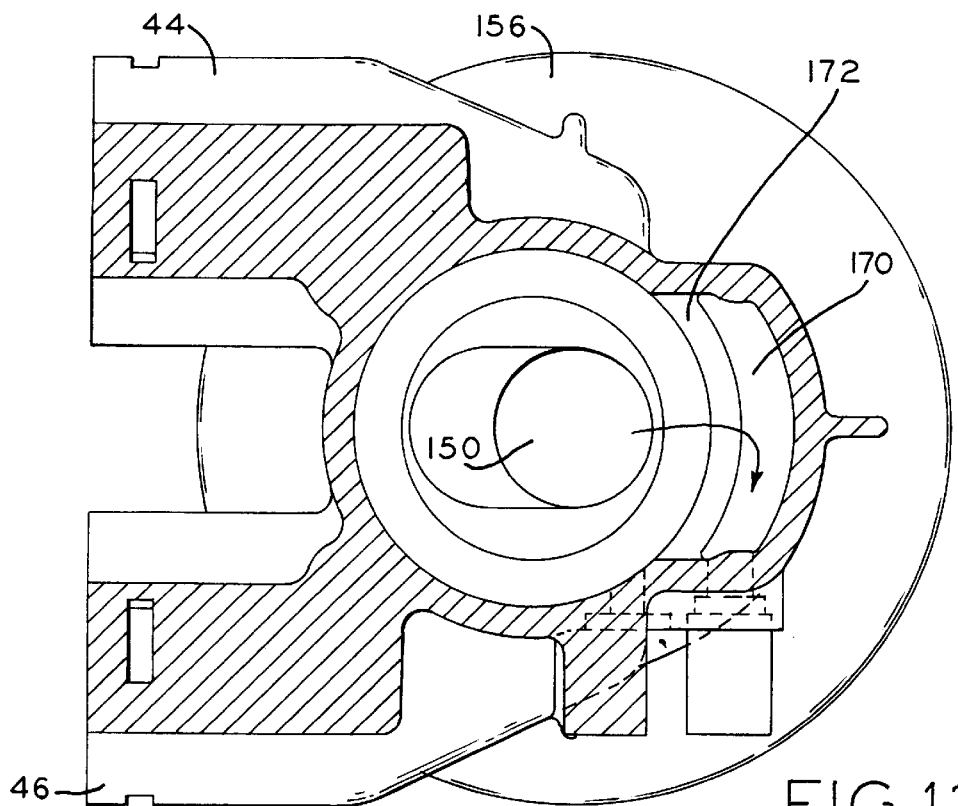
FIG. 13 is a cross-sectional view of the valve body taken through line 13—13 of FIG. 9.

Valve body 22 also includes a front chamber 170 which opens downwardly into tank 154 when valve body 22 is attached to tank 154. Front chamber 170 is in fluid communication with the space 171 between inner cylinder 151 and neck 160 and is thereby in fluid communication with the tank interior at the top of tank 154. Slot 172 provides fluid communication between front chamber 170 and central opening 54 as can be seen in FIGS. 3 and 13. Slot 172 is disposed above opening 45 whereby an annular disk 68 is positioned axially between opening 45 and slot 172 as can be seen in FIG. 28a.

Figure 12:
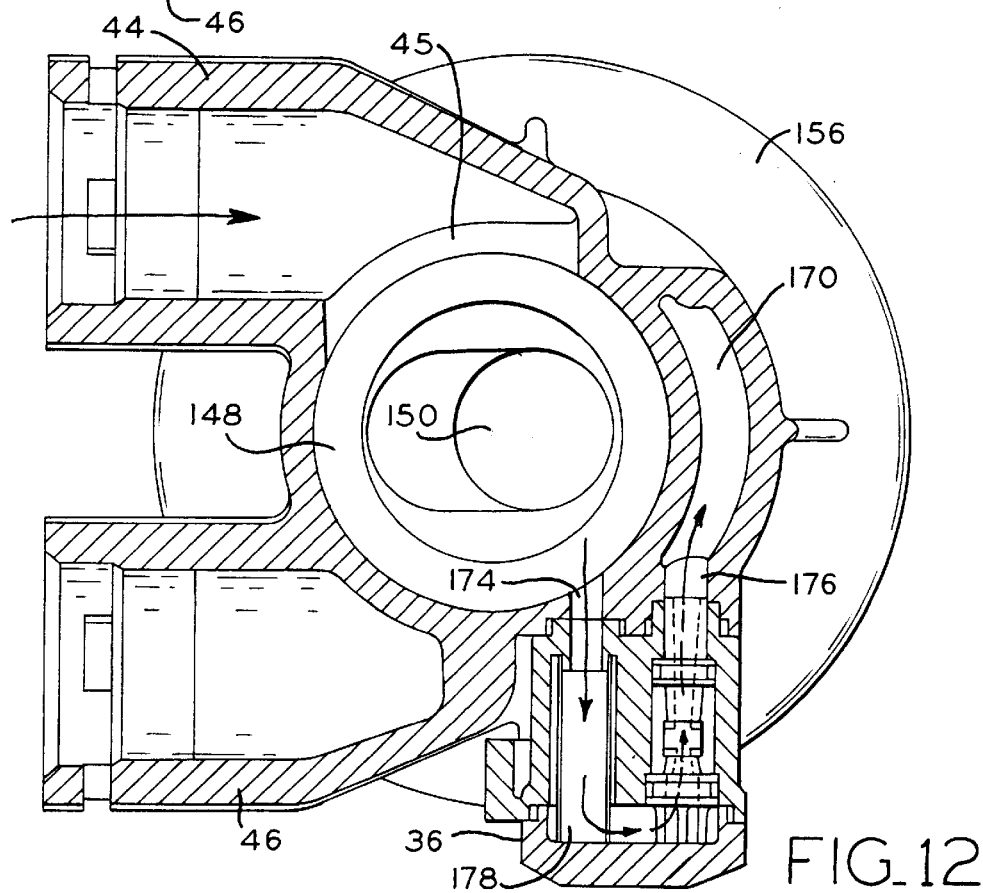
FIG. 12 is a cross-sectional view of the valve body taken through line 12—12 of FIG. 9.

First and second brine valve openings 174 and 176 are located at the same level as inlet opening 45 as can be seen in FIG. 12. First brine valve opening 174 is in fluid communication with central opening 54 and thus also in fluid communication with inlet opening 45. A generally U-shaped brine valve passage 178 located in brine valve module 36 extends from first brine valve opening 174 to second brine valve opening 176. Second brine valve opening 176 provides fluid communication between brine valve passage 178 and front chamber 170. Although in the disclosed embodiment brine valve openings 174 and 176 are located in the same horizontal plane as depicted in FIG. 12, FIGS. 28a–28e schematically represents brine valve opening 176 as being disposed above opening 174 for purposes of graphical clarity. It is also noted that in FIGS. 28a–28e second brine valve opening 176 is depicted as being in communication with front chamber 170 via slot 172 which is functionally equivalent to the arrangement shown in FIG. 12.

Figure 14:
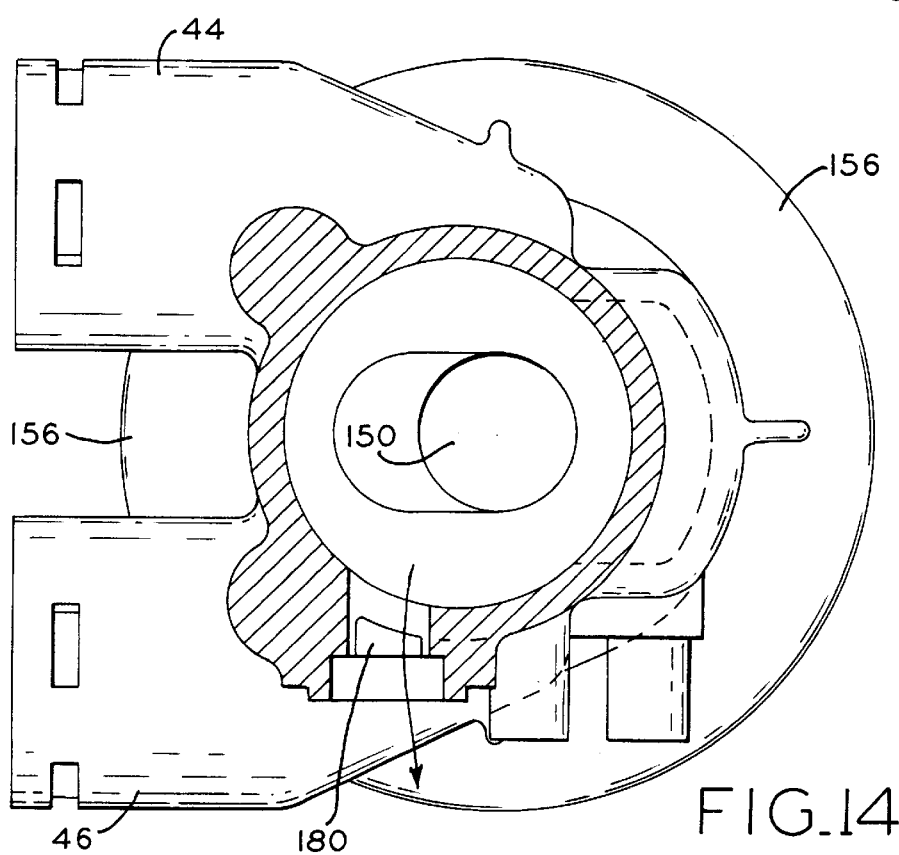
FIG. 14 is a cross-sectional view of the valve body taken through line 14—14 of FIG. 9.
Figure 21:
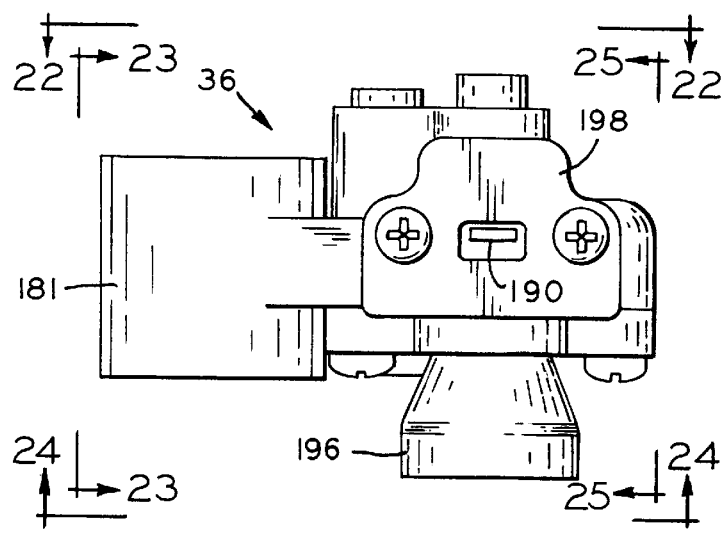
FIG. 21 is a top view of the brine valve module.
Figure 22:
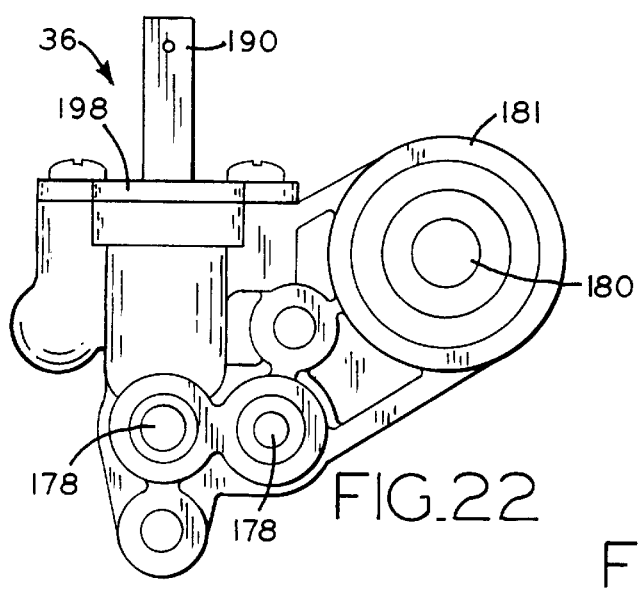
FIG. 22 is a view of the surface of the brine valve module which abuts the valve body.
Figure 23:
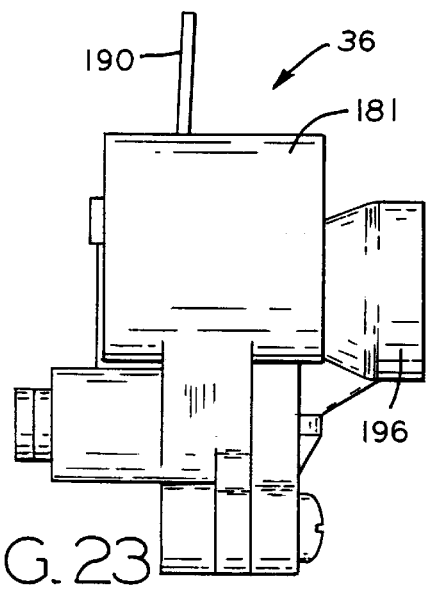
FIG. 23 is a side view of the brine valve module from the drain line side.
Figure 24:
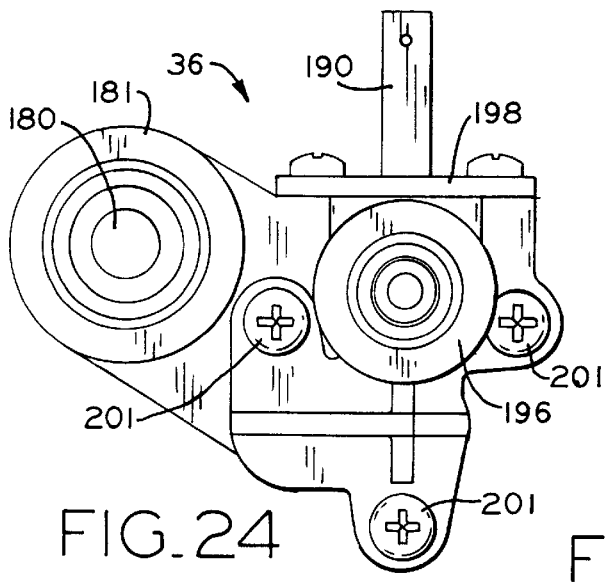
FIG. 24 is a view of the surface of the brine valve module disposed opposite the valve body.
Figure 25:
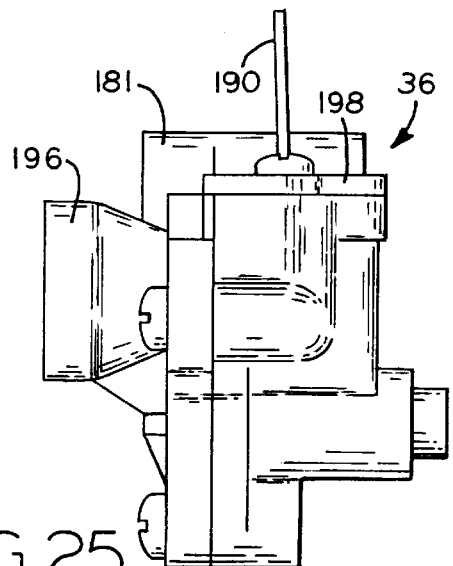
FIG. 25 is a side view of the brine valve module from the brine valve module side.
Figure 28A:
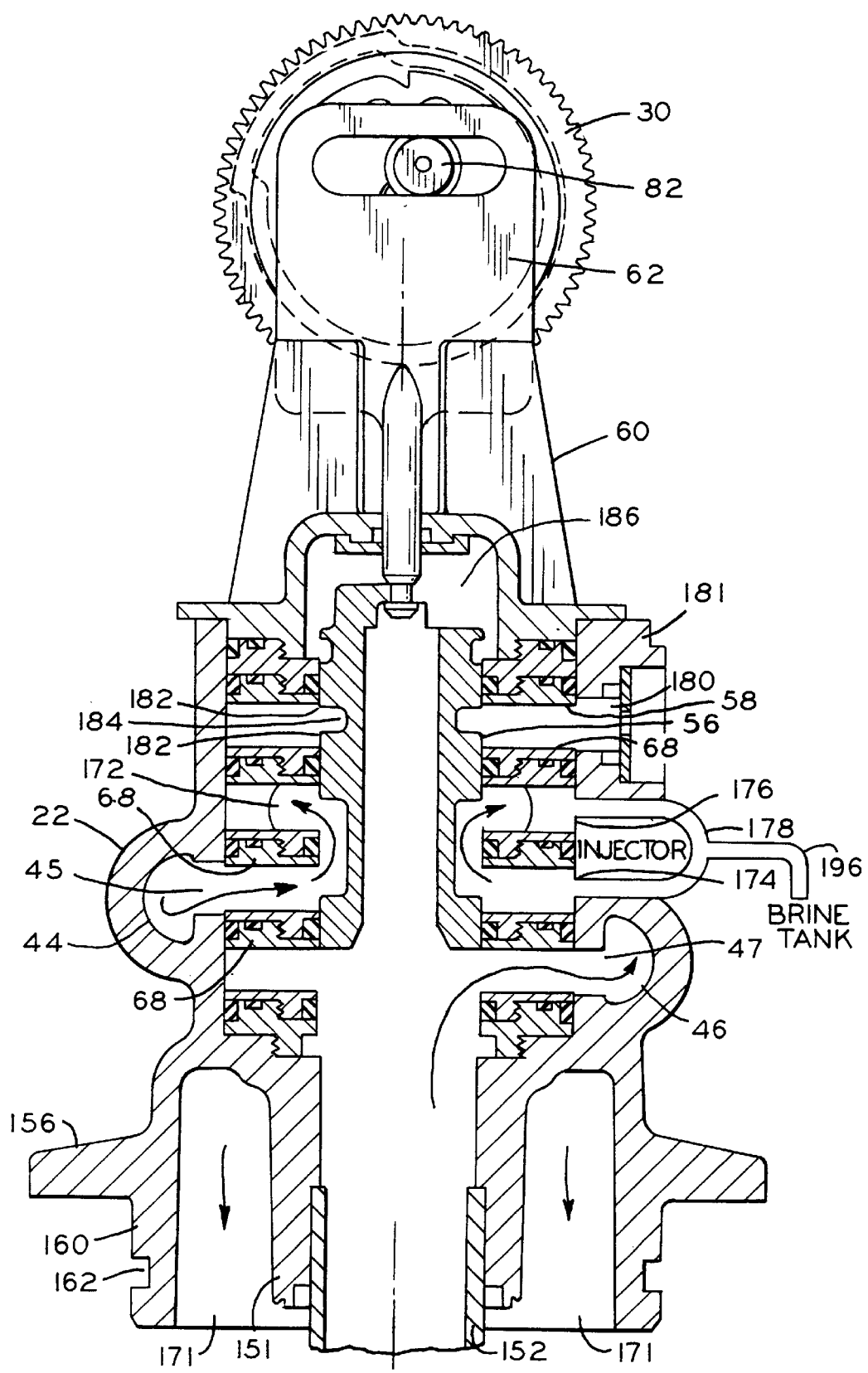
FIGS. 28a–28e are schematic cross-sectional views of the control assembly illustrating the fluid flow through the assembly during a regeneration cycle.

As shown in FIG. 14, drain passage 180 is in fluid communication with central opening 154 above slot 172 whereby an annular disk 68 is positioned between slot 172 and drain passage 180 as shown in FIG. 28a.

As shown in FIG. 15, piston 56 includes raised annular elements 182 which are configured to sealingly engage the interior of annular disks 68 and prevent the passage of water from one side of annular disk 68 to the other side. Recessed regions 184 disposed between elements 182 on piston 56 do not engage disks 68 and, thus, permit water to flow from one side of an annular disk 68 to the other side when a recess 184 is disposed adjacent the annular disk.

FIGS. 28a–28e schematically illustrate how the vertical movement of piston 56 regulates the fluid flow through valve body 22, as is known in the art. FIG. 28a depicts apparatus 20 in a service position. In the service position, drive mechanism 30 is positioned as shown in FIG. 1, with the switch arm 140 extending into recess 138. In this position untreated water enters valve body 22 through inlet 44. The untreated water enters central opening space 54 through opening 45. The annular disk 68 immediately below opening 45 is engaged by a piston element 182 but the disk 68 immediately above opening 45 has a recess 184 disposed adjacent the annular disk. The next uppermost disk is sealingly engaged by a piston element 182. Thus, fluid entering from opening 45 is directed upwards where it enters slot 172 and enters the tank interior at the top of tank 154. Brine valve passage openings 174 and 176 are subjected to water entering valve body 22 from inlet 44 and there is no pressure differential between openings 174 and 176 and, thus, no more than minimal fluid flow through passage 178.

Still referring to FIG. 28a, as the water travels downward through tank 154 it is treated due to its contact with the media and the now treated water flows upward through center tube 152 and enters openings 150 and 54 where it exits valve body 22 through outlet 46. In the service position, piston elements 182 engage disks 68 immediately above and below drain opening 180 to prevent water from being discharged through drain opening 180.

Upon initiation of the regeneration cycle, drive mechanism 30 begins to rotate and piston 56 is moved downward relative to annular disks 68. In so doing, the phases of regeneration take place in turn. First, drive mechanism 30 rotates to a position which begins the pre-rinse phase of the regeneration cycle, wherein piston 56 has moved to a point where water entering through inlet 44 is being closed off from slot 172 but still enters front chamber 170 via brine valve passage 178. Water flowing up through center tube 152 can be discharged through drain passage 180 by flowing through the interior of piston 56 and entering drain passage 180 from above via the upper chamber 186 which is no longer sealingly separated from drain passage 180 by a piston element 182. Water flowing up through center tube 152 may also be discharged through outlet 46 if there is a demand for the water. In residential applications, if there is no demand for water, e.g., no faucets or other water sources are being employed, no water will exit outlet 46. The regeneration cycle is preferably run during a time of day when little or no demand for water is expected. Often times, 2 a.m. is an appropriate time to begin the regeneration cycle.

The next change occurs when the drive mechanism has rotated to a position which ends the pre-rinse phase of the regeneration cycle. At this point, the water entering through inlet 44 can enter the top of tank 154 via slot 172 and also directly enter the top of center tube 152 and outlet 46. Thus, any water discharged through outlet 46 at this point in the regeneration cycle will be untreated water. Drain passage 180 is not open at this point in the regeneration cycle. Next, the backwash phase of the regeneration cycle begins. At this point, a piston recess permits water from inlet 44 to flow downward within opening 54 to center tube 152 and to outlet opening 47. A piston element 182 prevents fluid from inlet 44 from entering front chamber 170 via slot 172. Thus, fluid from inlet 44 flows downward through tube 152 (the incoming fluid is only discharged through outlet 46 if there is a demand for water).

The downward flowing fluid exits the bottom of center tube 152 and is used to lift and backwash the media bed. The backwash fluid flows upward through the tank and enters valve assembly 22 through space 171 where it enters front chamber 170 and flows through slot 172 into opening 54. A piston element 182 engages the disk 68 disposed between slot 172 and inlet opening 45 but a recess 184 is disposed adjacent the seal in the annular disk between slot 172 and drain opening 180. Thus, backwash fluid entering opening 54 from slot 172 flows upward and is discharged through drain opening 180. The backwash fluid cannot flow into upper chamber 186 and down through the interior of piston 56 because a thin annular element 182 engages the O-ring seals on the disk 68 located above drain passage 180. Fluid passage 178 is open on one side (opening 176) to backwash fluid present in front chamber 170 and, on the other side (opening 174), to fluid entering opening 54 through inlet 44. There is little, if any, pressure differential between the two openings 174, 176 of fluid passage 178 at this time and, thus, little, if any, fluid flows through passage 178 during the backwash cycle.

After the regeneration cycle concludes, the piston 56 moves downward to a point at which the water entering central opening 54 through inlet 44 is prevented from entering center tube 152 but may still be directly discharged through outlet 46. Water entering central opening 54 through inlet 44 is prevented from entering front chamber 170 via slot 172 but may enter front chamber 170 via fluid passage 178. Water entering front chamber 170 from passage 178 then flows downward through space 171 and enters the tank interior at the top of tank 154. Fluid from the interior of tank 154 then flows up center tube 152 and is discharged through drain opening 180. Next, brine draw camming element 144 disposed on drive mechanism 30 begins to cammingly bias brine valve lever 34 against arm member 190 of sealing module 188 to thereby open the sealing module to the brine tank line 196.

Brine valve module 36 is illustrated in FIG. 1a and can be seen in greater detail in FIGS. 17–26. Brine valve module 36 provides selective fluid communication between valve body 22 and a brine tank. Conveniently, the brine valve module is easily removed as a unit by simply removing fasteners 201 (FIG. 1). The brine valve module can be interchanged with a filter plug module 246 (FIG. 1) as described in detail hereinbelow.

Brine valve module 36 includes a housing 181 which defines a portion of drain passage 180. The brine valve portion of the module includes brine line sealing module 188 which is associated with the brine tank line 196. Sealing module 188 is operatively connected to drive mechanism 30 through arm member 190 and lever 34, and provides selective sealing of brine tank line 196 thereby. Brine line sealing module 188 includes a rigid arm member 190 and a generally T-shaped resilient sealing portion 192. As can be seen in FIG. 17, sealing portion 192 includes an annular sealing lip 194 which sealingly separates brine tank line 196 from passage 178. Arm member 190, which may be a metallic material, is embedded in the resilient sealing portion 192 and pivotal movement of arm member 190 disengages annular sealing lip 194 and thereby provides fluid communication between brine tank line 196 and passage 178 via brine valve chamber 200 as shown in FIG. 18. Arm member 190 extends through slot 191 (FIG. 3) in front housing member 24 to engage lever 34. Slot 191 has a length which permits front housing member 24 to be rotated without obstruction by arm member 190.

A metallic mounting plate 198 is secured to module 36 and secures the upper arms of sealing portion 192 in place and thereby seals the upper end of brine valve chamber 200. While mounting plate 198 is metallic in the illustrated embodiment, mounting plate 198 may be made from plastic or other suitable materials. Advantageously, by removing two screws 199 (FIG. 21) and then removing plate 198, the entire brine line sealing module 188, including arm member 190 and sealing portion 192 can be removed as a unit.

Injector 202 is disposed within passage 178 and defines opening 176. Injector 202 forms a venturi tube with lateral openings 204 disposed where the venturi effect creates the greatest fluid velocity and the minimal fluid pressure. Fluid passing through passage 178 must flow through injector 202 due to O-ring seals 206. Tabs 208 at one end of injector 202 keep injector 202 in its proper position. A wire mesh cylindrical filter screen 210 is disposed in passage 178 opposite injector 202 near opening 174 as can be seen in FIG. 19. The use of filter screen 210 reduces the possibility of clogging injector 202.

Figure 28B:
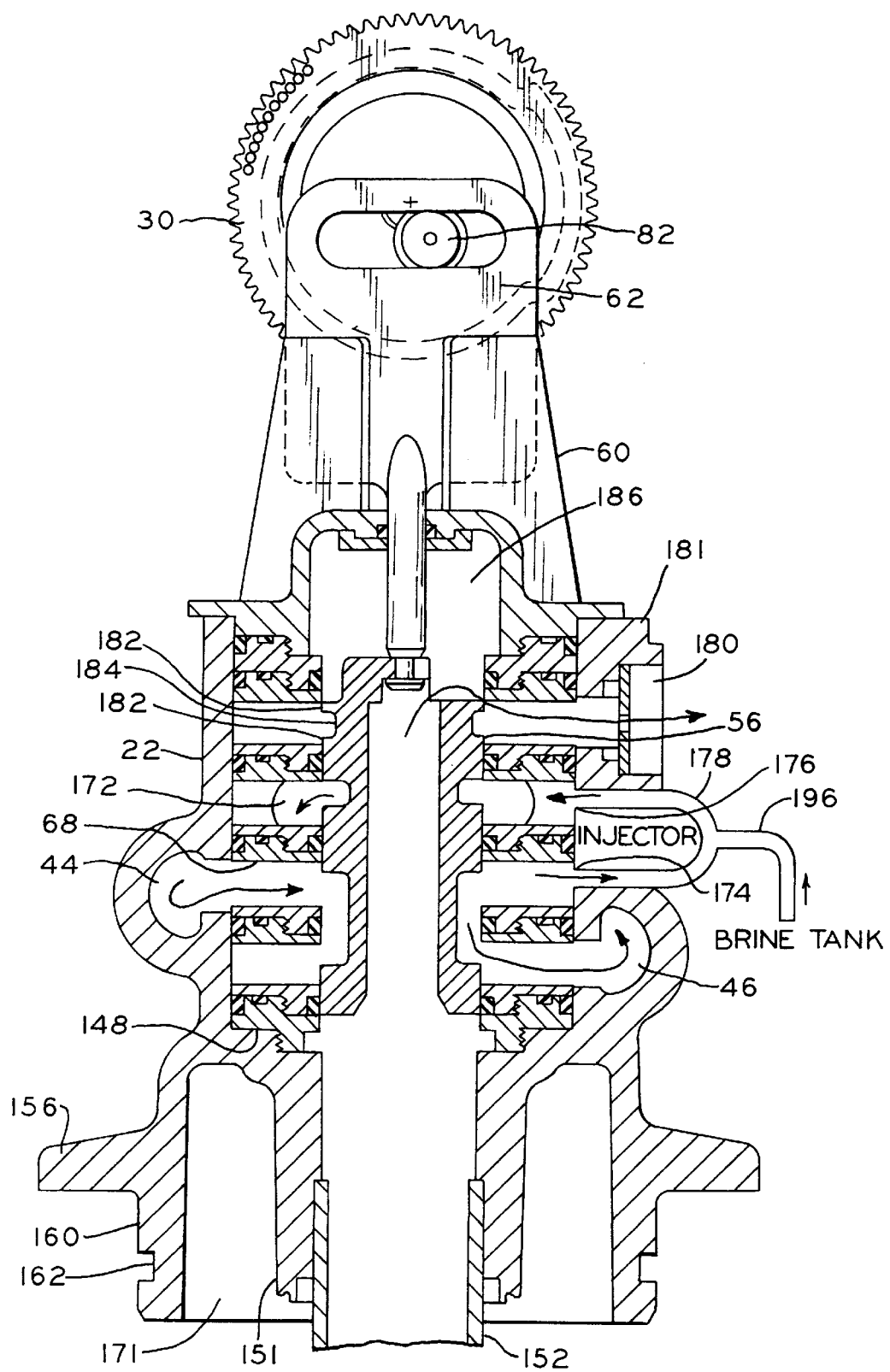

Turning now to FIGS. 28b and 12, when apparatus 20 is in this position, water is flowing from inlet 44 through passage 178 from opening 174 to opening 176, through front chamber 170 to the tank interior, up center tube 152 and out drain passage 180. A bi-directional flow washer 179 maintains the flow rate through drain passage 180 at 1.5 gallons per minute. Flow washer 179 can be interchanged with different sized flow washers to produce flow rates of 2.4, 3.0, 4.0, and 5.0 gallons per minute, as desired. All of the water flowing out drain passage 180 enters the tank interior through passage 178. As the water flows through injector 202 it creates a relatively low pressure area at lateral openings 204 (venturi effect) and when brine line sealing module 188 is placed in an open position as shown in FIG. 18, brine solution from the brine tank is drawn into injector 202 via brine valve chamber 200 and the resultant mixture of raw water and brine solution enters front chamber 170. The brinish solution then enters the media bed from the top of tank 154 and replenishes the media beads. The brinish solution is depleted as it flows downward through the media bed and the exhausted solution is discharged through drain passage 180.

FIGS. 29a–29d illustrate how brine draw camming element 144 biases brine valve lever 34 against sealing module 188 and thereby opens the brine line. The length of brine draw camming element 144 is configured to be more than sufficient to draw the anticipated quantity of brine solution so that the quantity of brine solution which is used to replenish the media is not determined by the length of the brine draw phase but by how much water is used to refill the brine tank as discussed in greater detail below. Thus, a brine draw camming element which has a length sufficient to draw the largest anticipated quantity of brine solution will be sufficient for smaller quantities and can be used for nearly all applications.

Figure 28C:
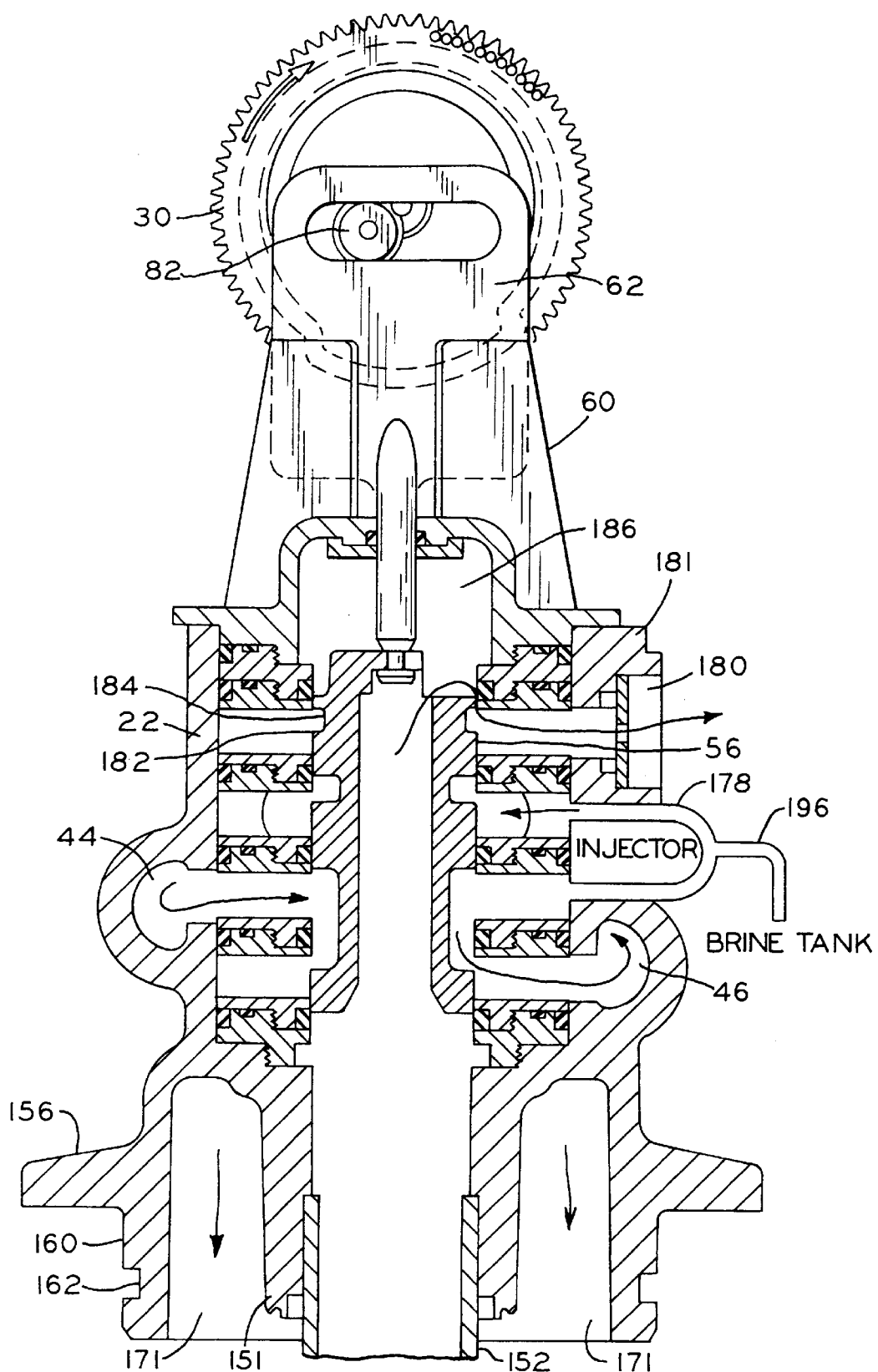
Figure 28D:
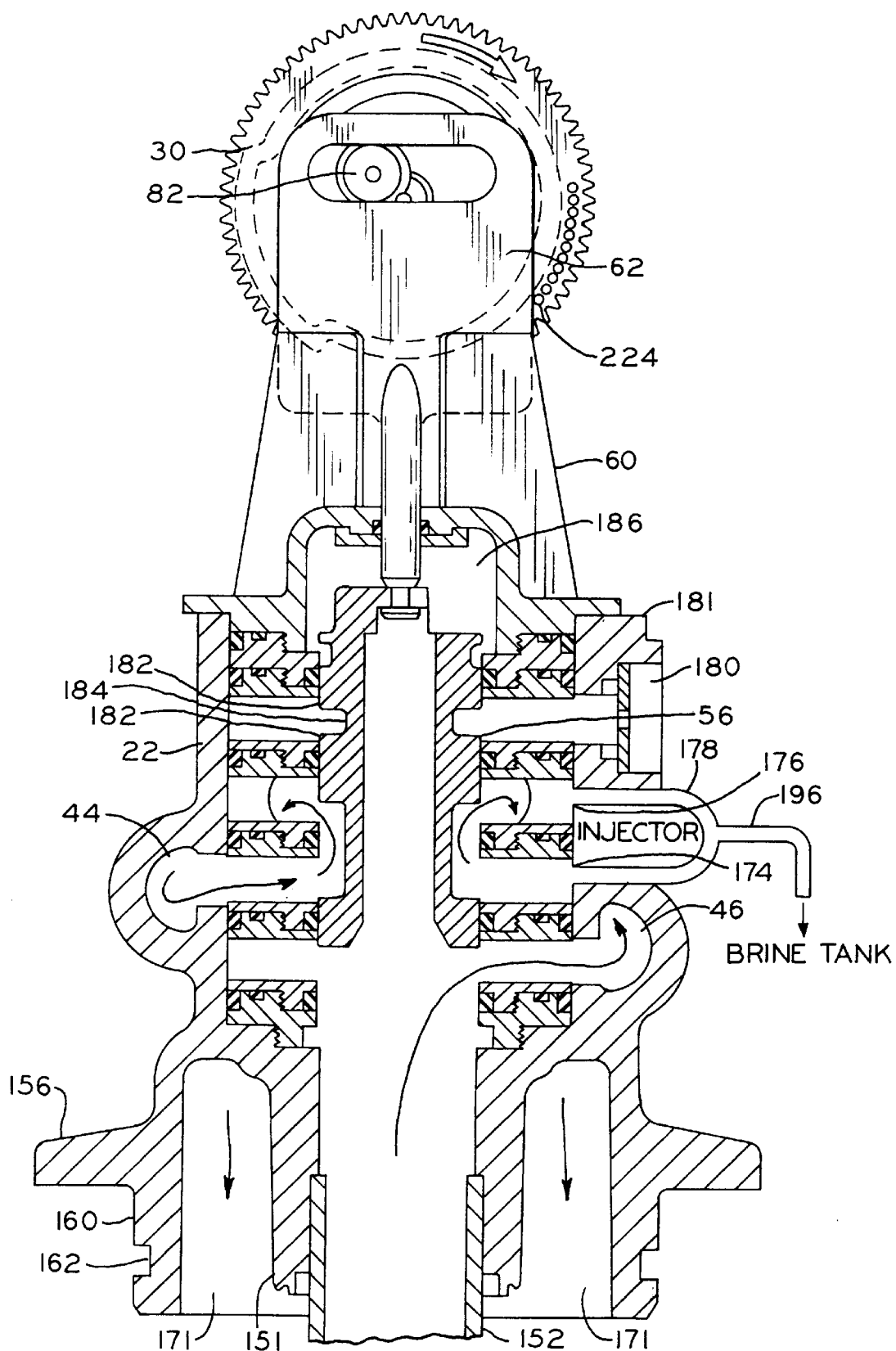
Figure 29A:
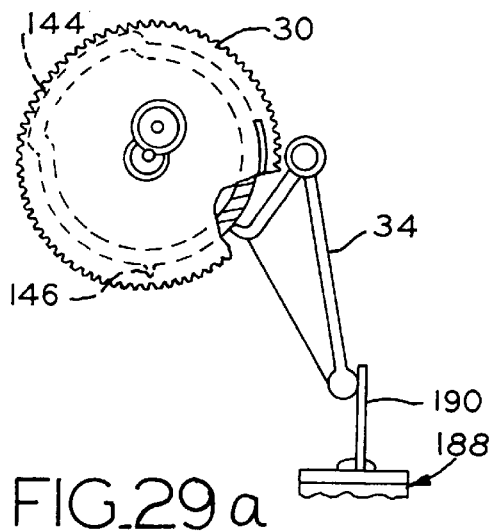
FIGS. 29a–29d schematically illustrate the interaction of the drive gear, the lever, and the sealing module, before, during, and immediately after the brine draw portion of the regeneration cycle.
Figure 29B:
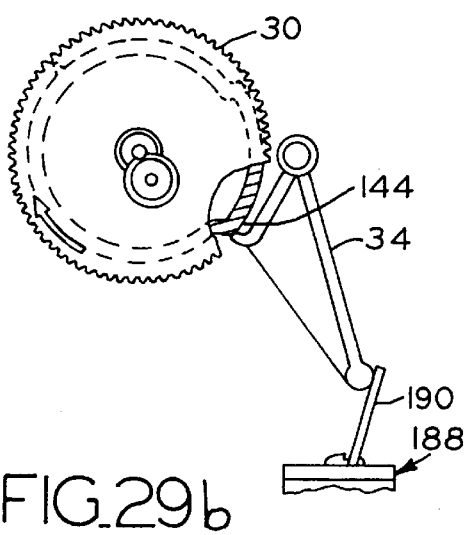
Figure 29C:
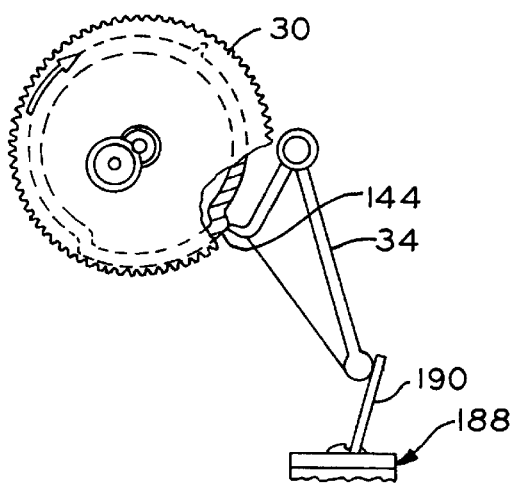
Figure 29D:
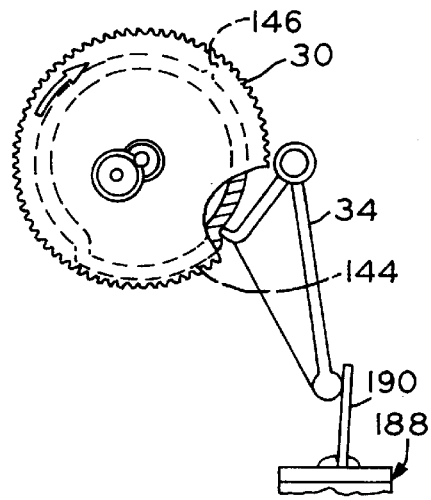

The next stage of the cycle is the brine draw phase, at which piston 56 has reached its lowest position. At this point in the regeneration cycle, the brine valve is still open. The brine tank, however, has been emptied and there is no longer any brine solution being drawn into modular control apparatus 20. Water entering through inlet 44 still flows through passage 178 to enter tank 154 as in FIG. 28b. This produces a slow rinse cycle with the relatively low flow of water entering the tank through passage 178 slowly forcing the brine solution through the tank. Upon further rotation of drive mechanism 30, camming element 144 no longer biases the brine valve into an open position via lever 34. FIG. 28c illustrates the flow through modular control apparatus 20 and FIG. 29d illustrates the interaction of camming element 144, lever 34 and arm member 190 at this point in the regeneration cycle. Spring 212 biases the brine valve into a closed position when lever 34 is not biasing arm 190 into an open position as best seen in FIGS. 1 and 17. However, it has been found that spring 212 is not necessary to bias sealing module 188 closed because the water pressure within chamber 200 effectively biases sealing module closed. Spring 212 provides a more controlled response to the closing of the sealing module.

As the drive mechanism continues to rotate, piston 56 has moved upwards to a position wherein inlet 44 is in fluid communication with opening 54 and water flows from inlet 44 downward through center tube 152 thereby reversing the flow of water. Water entering opening 54 through inlet 44 may also directly enter outlet 46 if there is a demand for water. There is no significant pressure differential between openings 174 and 176 and, thus, little, if any, fluid flows through passage 178. Upon further upward movement of piston 56, a piston element 182 has sealingly engaged the disk 68 disposed between inlet opening 45 and outlet opening 47 and a recess 184 is disposed adjacent the disk 68 separating slot 172 from inlet opening 45. Water entering central opening 54 through inlet 44 flows through slot 172 into front chamber 170 and downward into tank 154 through space 171. Fluid flowing up through center tube 152 is discharged through drain opening 180. If there is a demand for water, water flowing up within center tube 152 will be discharged through outlet 46. Since the media was previously replenished during the brine draw phase and the water entering outlet 46 from center tube 152 will have been first directed downward through the media bed, the water discharged through outlet 46 at this time will be treated water.

Next in the cycle, a piston element 182 has begun to engage the disk 68 directly above drain opening 180. Piston elements 182 then sealingly engage the disks 68 immediately below and above drain passage 180 thereby preventing fluid from being discharged through drain line 180. Fluid entering through inlet 44 flows through slot 172, downward through chamber 170 and space 171 into the tank interior where it flows downward through the media and returns upward through center tube 152. After returning up center tube 152, the treated fluid may then be discharged through outlet 46 if there is a demand for water.

The next stage is the brine refill phase of the regeneration cycle. At this point in the regeneration cycle, illustrated in FIGS. 28d and 30a–30c, the brine refill camming element 146 biasingly engages lever 34 and thereby opens the brine valve. Inlet 44 supplies water to opening 54 and is in direct fluid communication with passage 178 via opening 54. The drain passage 180 remains closed and, thus, no water is discharged through the drain passage 180. After flowing up through center tube 152 water may be discharged through outlet 45 if there is a demand for water. In the absence of an open faucet or other demand for water, however, no water will be discharged through outlet 46. The brine tank is empty at this point in the regeneration cycle and when the brine valve is now opened, the water pressure on the treatment tank side of the valve will be greater than the pressure in brine tank line 196 and water will flow through the brine valve into the brine tank.

A flow washer 197 (FIG. 17) is present in brine tank line 196 and, in the exemplary embodiment, limits the flow of water through the line to 0.5 gallon per minute. (Alternative embodiments may utilize flow washers having a different flow rate, such as 0.25 or 1.0 GPM.) Thus, by controlling the amount of time the brine valve is open, the quantity of water entering the brine tank can be controlled. The exemplary embodiment is adapted for use in a residential water softening system wherein the brine tank is filled with sodium chloride or "salt." Water placed in the brine tank will dissolve the salt until the water becomes saturated and becomes a "brine solution." When the brine solution is used to replenish the media in treatment tank 154, the calcium and magnesium ions present on the media are exchanged for sodium ions present in the brine solution. (When the treatment tank is in service, i.e., treating water, the sodium ions present on the media beads are exchanged for undesirable ions present in the untreated water, typically calcium and magnesium.)

Each gallon of water placed in the brine tank will dissolve approximately 3 pounds of sodium chloride at room temperature and all of the resulting brine solution will be drawn into the water treatment tank to replenish the media during the next regeneration cycle. Thus, the amount of time the brine valve remains open during the refill phase of the regeneration cycle will determine the quantity of sodium ions which are used to replenish the media. The quantity of sodium ions required for each application will depend upon the quality of the untreated water and the anticipated quantity of water which will be treated between regeneration cycles.

The exemplary embodiment refills the brine tank after the brine draw phase of the regeneration cycle. It is possible to refill the brine tank during the initial stages of the regeneration cycle and subsequently draw that same water, which has become a brinish solution, during the replenishment phase of the cycle. There is a risk, however, that the water will not have sufficient time to dissolve a sufficient quantity of salt to become a fully saturated solution or that the water may be relatively cold and thereby limit its ability to dissolve the salt. By refilling the brine tank after the brine draw phase of the cycle, however, the water used to refill the brine tank will have one or more days to both reach room temperature and dissolve the salt thereby providing greater consistency and predictability to the quantity of salt used in each regeneration cycle.

The time the brine valve remains open during the brine refill phase of the regeneration cycle, and hence the quantity of water placed in the refill tank, is determined by the interaction of brine valve lever 34 and brine refill camming element 146. As can be seen in FIGS. 30d–30i, brine valve lever 34 includes an opening 214 through which a threaded fastener 216 (FIG. 1a) may be inserted to pivotally attach lever 34 to front housing member 24. Lever 34 includes a generally cylindrical or bulbous element 218 at one end which engages arm member 190 as seen in FIG. 1a. Opposite element 218 is a camming finger 220.

Figure 30A:
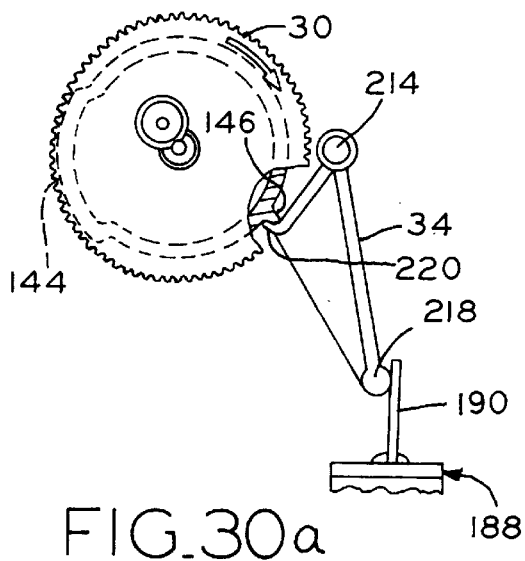
FIGS. 30a–30c schematically illustrate the interaction of the drive gear, the lever, and the sealing module during the brine refill portion of the regeneration cycle.
Figure 30B:
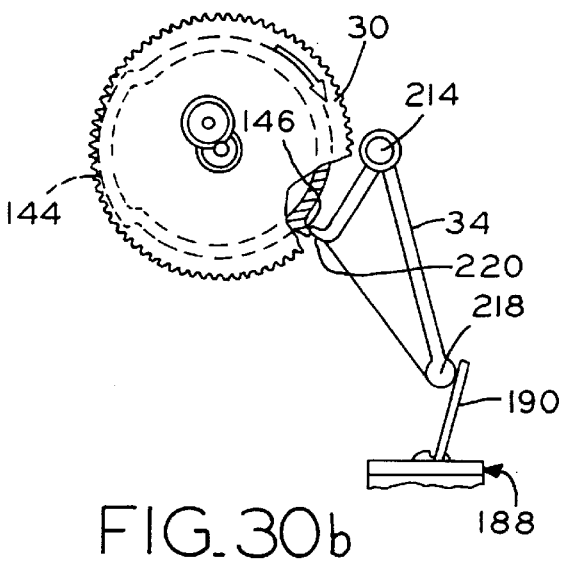
Figure 30C:
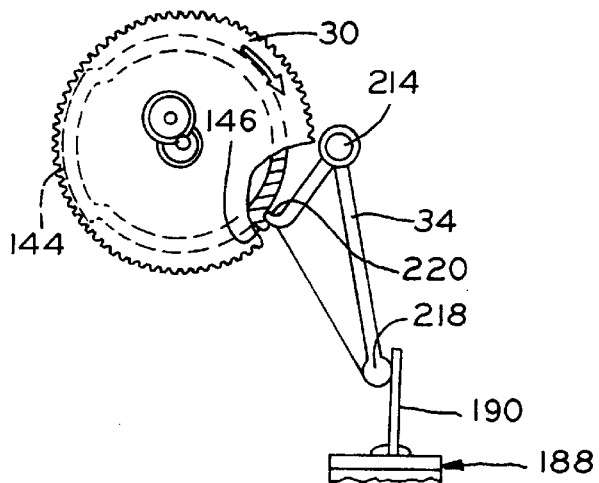

Camming finger 220 has a distal surface 222 which engages drive mechanism 30 and is biased outward by engagement with camming elements 144 and 146 disposed on drive mechanism 30. FIGS. 30a–30c illustrate the interaction of camming element 146, lever 34 and arm member 190 in opening the brine valve during the brine refill phase of the regeneration cycle. The distal surface 222 of lever 34 is configured to maintain the brine valve in an open position for 4 minutes during the brine tank refill phase of the regeneration cycle. Because brine tank line 196 has a 0.5 gallon per minute flow washer, 2 gallons of water will enter the brine tank during the 4 minute brine tank refill phase of the cycle thereby producing 2 gallons of brine solution (with 6 pounds of dissolved salt) for the next regeneration cycle.

Altering the transverse length of the distal surface of the lever finger alters the period of time for which the brine valve is open during brine refill cycle and thus alters the quantity of sodium ions used to replenish the media during the next regeneration cycle. FIGS. 31a and 31b illustrate a lever 34a which is similar to lever 34 except that the finger 220a on lever 34a has a distal surface 222a which has a greater transverse length than the distal surface 222 on the 6 pound lever 34. (The term "6 pounds" refers to the pounds of salt dissolved during the regeneration cycle resulting from the use of lever 34, thus lever 34a may be referred to as a "9 pound" lever). The longer distal surface 222a of lever 34a maintains the brine valve in an open position for 6 minutes during the brine tank refill phase of the regeneration cycle. In the exemplary embodiment, the use of lever 34a thus results in the use of 9 pounds of salt during each regeneration cycle. Similarly, lever 34b which has a finger 220b with a transverse surface 222b which is even longer than that of lever 34a. Lever 34b, which is illustrated in FIGS. 32a and 32b, maintains the brine valve in an open position for 8 minutes during the brine tank refill phase of the regeneration cycle resulting in the use of 12 pounds of salt during each regeneration cycle.

Interchangeable levers 34, 34a and 34b also maintain the brine valve in an open position for slightly different periods of time during the brine draw phase of the regeneration cycle. The minimal brine draw phase, however, is deliberately longer than necessary to remove all of the brine solution from the brine tank for the largest anticipated quantity of brine solution. Thus, the slight differences in time for the brine draw phase resulting from the different levers is inconsequential.

Brine valve levers 34, 34a, and 34b are easily interchanged in apparatus 20 by merely removing fastener 216, removing the then currently installed lever, and inserting a different lever. Thus, the homeowner can easily adjust the quantity of salt used in each regeneration cycle by merely interchanging the brine valve lever. As previously mentioned, cover 98 includes two extensions 108 to which two differently configured brine valve levers can be attached. Color coding the differently configured levers, e.g., having a white 6 pound lever 34, a blue 9 pound lever, and a red 12 pound lever, makes it easier to distinguish the differently configured levers.

Another advantage provided by the use of interchangeable levers is that decided action is required to change the lever and thereby change the salt settings. This eliminates the possibility of accidently changing the salt setting by movement of control knobs or other easily adjusted control mechanism which could happen when an easily adjusted control mechanism is not shielded from accidental contact or when children have access to the easily adjusted control mechanism.

Figure 28E:
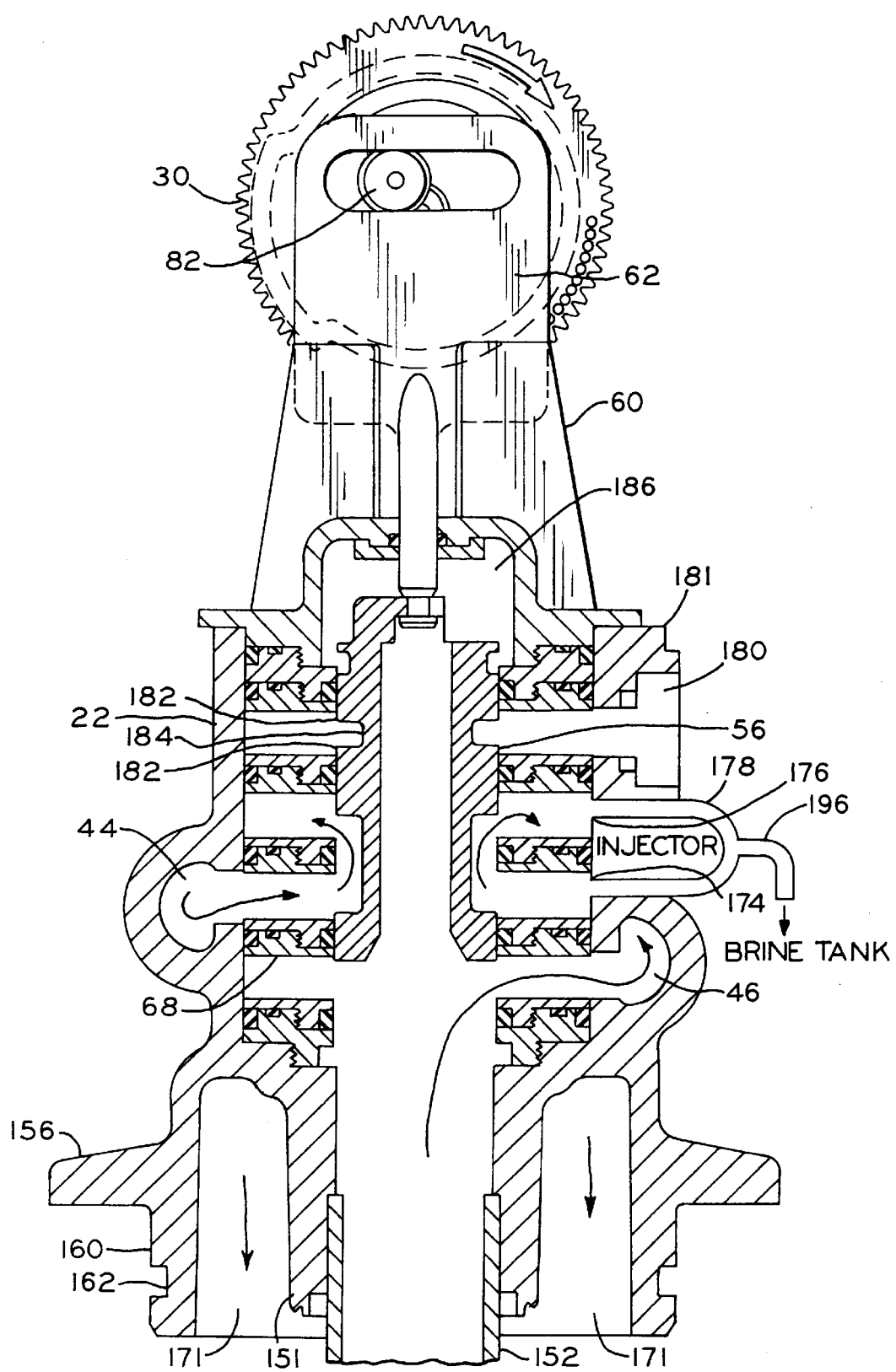

An alternative embodiment using removable pins 224 is now described with reference to FIGS. 28e. Instead of using a fixed camming element 246 and interchangeable levers 34, it is also possible to adjust the duration of the brine refill phase by using removable pins 224 in drive mechanism 30 as shown in FIG. 28e. Removable pins 224 may be used to provide an adjustable length brine refill camming element on drive mechanism 30 instead of (or in addition to) adjusting the length of the distal transverse surface of the brine valve lever finger. For example, if such a removable pin system were used and only one pin was placed in drive mechanism 30, after approximately 151 minutes when drive gear has rotated 302°, the brine valve would close. Similarly, if eleven pins were placed in drive mechanism 30, after approximately 171 minutes when the drive gear has rotated 342°, the brine valve would close.

It can now be appreciated that an adjustable engagement means has been disclosed herein. One embodiment of the adjustable engagement means includes interchangable levers 34, 34a and 34b. Interchanging the levers thereby alters the time that the sealing module will remain open as the drive mechanism 30 rotates, as described above. A second embodiment of the adjustable engagement means includes removable pins 224, also described above. By removing and/or adding pins, the time that sealing module 188 remains open as drive mechanism 30 rotates is correspondingly altered.

After approximately 180 minutes, drive mechanism 30 has rotated 360°, switch arm 140 has fallen into recess 138 and drive motor 118 is no longer supplied with power. In this "home position" or "service position," water entering central opening 54 through inlet 44 is directed into slot 172 where it travels downward and enters tank 154, as the water travels downward through the media it is treated. The treated water near the bottom of tank 154 enters the lower end of center tube 152 and travels upward into central opening 54 where it may be discharged through outlet 46. The brine valve and drain line 180 are closed in the "home position." Apparatus 20 remains in this "home position" until the next regeneration cycle is initiated.

Although the details of the regeneration cycle such as the timing and rotational increments have been described in detail for the illustrated embodiment, this has been done to facilitate the understanding the invention and the details of the regeneration cycle may differ in alternative embodiments.

When a water treatment system employing apparatus 20 is installed in a residence, inlet 44 and outlet 46 must be connected with the plumbing present in the residence. Fittings 38 are used to provide a convenient manner of attaching inlet 44 and outlet 46 to the appropriate water lines within the residence. As seen in FIG. 8, fittings 38 include a cylindrical portion 226 which may be inserted into either inlet 44 or outlet 46. Cylindrical portion 226 includes two annular grooves 228 and 230. An O-ring seal is placed in groove 228 to provide a seal between fitting 38 and either inlet 44 or outlet 46. Groove 230 is positioned "behind" groove 228 whereby groove 228 is inserted further into the opening in which cylindrical portion 230 is inserted. Groove 230 is positioned in alignment with slots 234 in the inlet or outlet which receives fitting 38. The tabs 236 of spring clip 240, shown in FIG. 38, may then be inserted into groove 230 through slots 234 to retain fitting 38 (FIG. 8) in its installed position. Collar 232 abuts the outer edge 238 of the opening into which fitting 38 is inserted and is spaced from groove 230 a distance which corresponds to the distance slot 234 is spaced from abutting edge 238 to facilitate the installation of spring clip 240. The use of spring clips 240 and fittings having cylindrical portions 230 is discussed in greater detail in the disclosure of U.S. Pat. No. 5,584,411 which is incorporated herein by reference.

Fittings 38 having cylindrical portions 230 adapted for sealing engagement with inlet 44 or outlet 46 may be manufactured with a wide variety of different styles and sizes of joining means opposite cylindrical portion 230. This permits fittings 38 be used with the wide variety of different plumbing styles and sizes currently being employed in the U.S. and other countries. For example, the end of fittings 38 opposite cylindrical portion 230 may be adapted to mate with either threaded or slip-on plumbing. Additionally, the threaded or slip-on end of fittings 38 may be of a wide variety of different diameters ranging, for example, from ¾" to 1½" fittings. Moreover, the threaded fittings may employ either U.S. or British threads. A large variety of combinations of sizes and styles is possible and an installer may bring a number of different fittings 38 when installing an apparatus 20. Thus, if the installer is unaware of the plumbing in use at the installation site prior to arriving at the site, the installer may bring a broad selection of fittings 38 and select, at the site, the fitting 38 having the appropriate style and size to cooperate with the plumbing employed at the installation site.

Fittings 38 which form an elbow, i.e., have a 90° bend as illustrated in FIG. 38, can greatly facilitate the installation of apparatus 20. Straight fittings, as shown in FIG. 1, may require the attachment of one or more elbow fittings to connect apparatus 20 to the existing plumbing. When the configuration of the existing plumbing requires one or more elbows in addition to fitting 38, the use of an elbow fitting 38 will replace the use of a straight fitting 38 and one of the conventional elbows. This substitution of an elbow fitting 38 as shown in FIG. 8 for a straight fitting 38 and a conventional elbow fitting reduces both the labor and material costs required to install apparatus 20. Furthermore, the cylindrical portion 230 of elbow fittings 38 are not threaded and, thus, the opposite end of elbow fitting 38 may be easily rotated to adapt to the configuration of the plumbing at the installation site.

The modular nature of apparatus 20 facilitates the use and manufacture of alternative embodiments of apparatus 20. For example, the illustrated apparatus 20 may be readily adapted to utilize an electronic controller as a timer. For example, a second miniature switch could be attached to apertures 242 and the switch arm of this second miniature switch could be used in combination with a series of additional recesses or other camming features located on the drive gear which would receive the second switch arm when the drive gear had moved to certain pre-determined rotational orientations. (The second miniature switch arm could be configured differently from arm 140 so that the features which trigger the second switch would not open first miniature switch 120.) The second switch would provide a signal to the electronic controller when the drive gear reached the various predetermined rotational orientations. Additionally, the drive motor could be altered to enable the drive motor to more rapidly rotate drive mechanism 30. The electronic controller could then step the drive gear through the regeneration cycle by quickly rotating the drive gear between predetermined rotational orientations where the drive gear would remain for predetermined periods of time. For example the drive gear would remain stationary in a "backwash position" for a predetermined period of time before the controller activated the drive motor and rotated the drive gear to the next predetermined rotational orientation. The second switch would provide a signal to the controller indicating when the drive gear reached each predetermined rotational orientation.

Apparatus 20 may also be readily adapted to form a filter control assembly which would utilize a backwash cycle but which would not require a brine draw or brine tank refill cycle. Apparatus 20 can be adapted to form a filter control assembly by removing lever 34, by using a cover plate and/or plugs to close openings 174 and 176 in place of a brine valve, and by using a differently configured piston. Different markings on knob 40 are also required for a filter control assembly.

Figure 46:
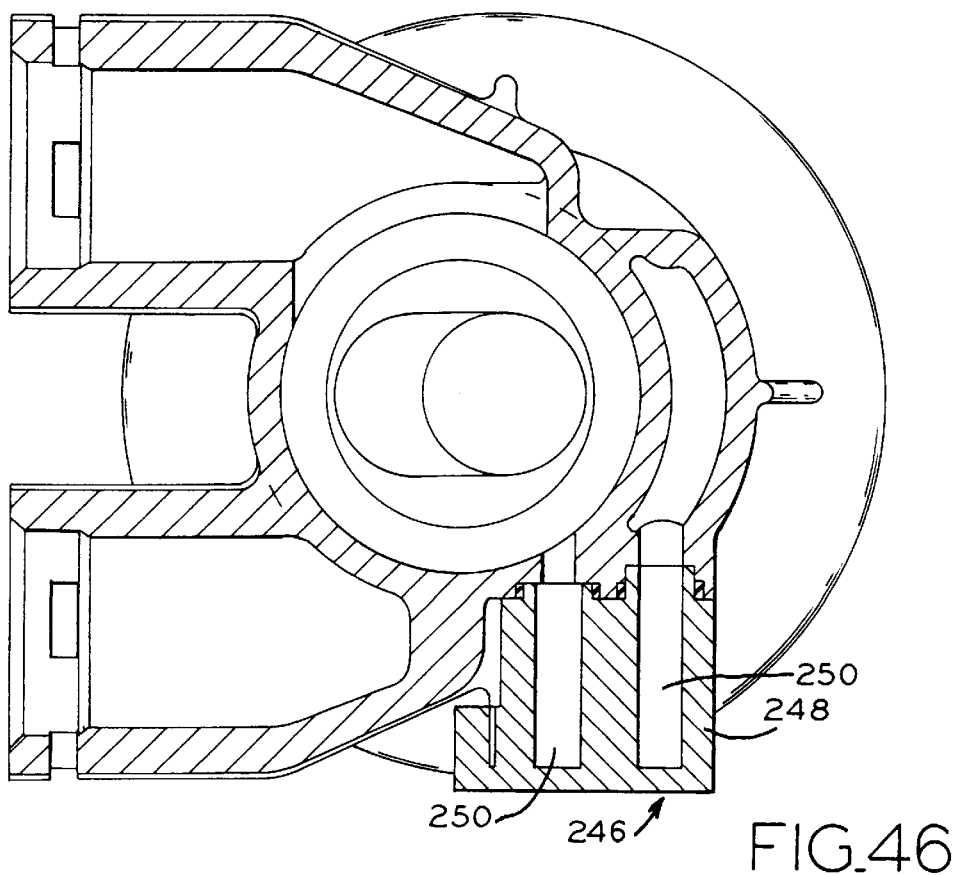
FIG. 46 is a cross sectional view of the filter tank control assembly.

FIGS. 42 through 46 illustrate a valve body 22 to which a filter plug module 246 has been attached instead of a brine valve module. Filter plug module 246 still includes a housing 181 for the drain line but instead of a brine valve, has two unconnected blind openings 250 located in plug portion 248. As shown in FIG. 46 (which is a cross section taken at the same location on valve body 22 as FIG. 12, i.e., line 12—12 of FIG. 9), blind openings 250 do not provide fluid communication between openings 174 and 176. As can be seen in FIGS. 42–45, no changes to valve body 22, front housing member 24 or cover 98 are required when a filter plug module is substituted for the brine valve module. Thus, filter plug module 246 is easily interchanged with brine valve module 36 by merely removing fasteners 201, interchanging the two modules, and reinstalling fasteners 201.

While this invention has been disclosed by describing exemplary embodiments, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A modular control apparatus for use in a water treatment system, said apparatus comprising:
    a housing member having a valve body attached thereto, said valve body adapted for installation on and fluid communication with a water treatment tank, said valve body defining a central opening;
    a valve cartridge disposed in said central opening, said valve cartridge including a moveable valve member therein;
    a drive mechanism operatively connected to said moveable valve member;
    a drive motor module mounted in said housing, said drive motor module driving said drive mechanism; and
    a first timer module mounted in said housing member and removable from said housing member as a unit, said first timer module selectively providing electrical power to said drive motor at a first predetermined interval and thereby initiating a regeneration cycle.

2. The modular control apparatus of claim 1, further comprising:
    a second timer module interchangeable with said first timer module, said second timer module selectively providing said electrical power at a second predetermined interval and thereby initiating the regeneration cycle, said second predetermined interval differing from said first predetermined interval, whereby interchanging said first and said second timer modules changes the frequency at which regeneration of the water treatment tank occurs.

3. The apparatus of claim 1, wherein said first timer module comprises an electro-mechanical timer module.

4. The apparatus of claim 1, further comprising a brine valve module attached to said valve body, said brine valve module adapted to provide selective fluid communication between said valve body and a brine tank, said brine valve module removable from said valve body as a unit.

5. The apparatus of claim 4, wherein said brine valve module is interchangeable with a filter plug module, whereby the water treatment system can function as a softener or a filter.

6. The apparatus of claim 4, wherein said brine valve module further comprises a sealing module, said sealing module operatively connected to said drive mechanism to provide selective sealing of a brine tank line, said sealing module removable from said brine valve module as a unit.

7. The apparatus of claim 1, wherein said drive motor module comprises a switch and a drive motor, said drive motor module being removable from said housing member as a unit.

8. The apparatus of claim 1, further comprising:
    a brine tank line in fluid communication with said valve body;
    a sealing module associated with said brine tank line and selectively opening and closing said brine tank line from said valve body;
    said drive mechanism comprising a drive gear having a camming element thereon;
    a first lever removably mounted in said housing member for pivoting movement therein, said camming element engaging a first distal surface of said first lever as said drive gear rotates, thereby biasing said lever against said sealing module and opening said sealing module; and adjustable engagement means for changing the length of time said sealing module remains open as said drive gear rotates.

9. The apparatus of claim 8, wherein said adjustable engagement means comprises a second lever interchangeable with said first lever, said second lever having a second distal surface having greater transverse length than said first distal surface, whereby said camming element engages said second distal surface for a greater duration than said first distal surface and further whereby said second lever biases said sealing module open for a longer time than said first lever.

10. The apparatus of claim 9, wherein said first and said second levers are color coded.

11. The apparatus of claim 1, wherein said housing member is pivotally attached to said valve body between a use position in which said housing member is positioned when the water treatment system is being used and an access position in which said housing member is positioned during servicing thereof.

12. The apparatus of claim 11, wherein at least one fastener secures said housing member in said use position.

13. The apparatus of claim 11, wherein said first timer module and said drive motor are mounted on a rear side of said housing member, said rear side oriented upwardly and forwardly of the treatment system in said access position, whereby said first timer module and said drive motor are exposed and accessible for servicing and replacement thereof.

14. The apparatus of claim 11, wherein said valve cartridge is exposed for removal as a unit when said housing member is positioned in said access position.

15. A modular control apparatus for use in a water treatment system, said apparatus comprising:
a valve body adapted for installation on and fluid communication with a water treatment tank, said valve body including an inlet for receiving untreated water and an outlet for dispensing treated water, said valve body defining a central opening;
a valve element removably disposed in said central opening;
a housing member pivotally attached to said valve body, said housing member pivotable between a use position in which said housing member is positioned when the water treatment system is being used and an access position in which said housing member is positioned during servicing thereof, said valve element being exposed for removal when said housing member is positioned in said access position.

16. The apparatus of claim 15, wherein at least one fastener secures said housing member to said valve body when said housing member is positioned in said use position.

17. The apparatus of claim 15, further comprising:
a drive gear rotatably mounted in said housing member;
a piston reciprocably disposed within said valve body, said piston operatively connected to said drive gear when said housing member is positioned in said use position, whereby rotation of said drive gear produces reciprocation of said piston; and
said piston being disconnected from said drive gear when said housing member is positioned in said access position.

18. The apparatus of claim 15, further comprising:
a first timer module and a drive motor module mounted on a rear side of said housing member; and
said rear side oriented upwardly and forwardly of the treatment system in said access position, whereby said first timer module and said drive motor are exposed and accessible for servicing and replacement thereof.

19. The apparatus of claim 18, further comprising a removable cover adapted to enclose said housing member when said housing member is positioned in said use position, said cover being removed from said housing member before said housing member is moved from said use position to said access position.

20. The apparatus of claim 18, wherein said valve element comprises a valve cartridge removably disposed in said central opening, said valve cartridge being exposed for removal as a unit when said housing member is positioned in said access position.

21. A modular control apparatus for use in a water treatment system, said apparatus comprising:
a valve body adapted for installation on and fluid communication with a water treatment tank, said valve body defining a central opening;
a valve cartridge removably disposed in said opening, said valve cartridge including a moveable valve member therein, said valve cartridge and said moveable valve member removable from said valve body as a unit;
a brine valve module attached to said valve body, said brine valve module adapted to provide selective fluid communication between said valve body and a brine tank, said brine valve module removable from said valve body as a unit.

22. The apparatus of claim 21, wherein said brine valve module further comprises a sealing module, said sealing module providing selective sealing of a brine tank line, said sealing module being removable from said brine valve module as a unit.

23. The apparatus of claim 21, wherein said brine valve module is interchangeable with a filter plug module, whereby the water treatment system can be interchanged between a softener and a filter.

24. The apparatus of claim 21, further comprising a housing member pivotally attached to said valve body, said housing member pivotable between a use position in which said housing member is positioned when the water treatment system is being used and an access position in which said housing member is positioned during servicing thereof.

25. A modular control apparatus for use in a water treatment system, the apparatus comprising:
a valve body adapted for installation on and fluid communication with a water treatment tank;
a brine tank line in fluid communication with said valve body;
a sealing module associated with said brine tank line and selectively opening and closing said brine tank line from said valve body;
a housing attached to said valve body, said housing having a drive mechanism rotationally mounted therein, said drive mechanism including a camming element thereon;
a first lever removably mounted in said housing for pivoting movement therein, said camming element engaging a first distal surface of said first lever as said drive mechanism rotates, thereby biasing said lever against said sealing module and opening said sealing module; and adjustable engagement means for changing the length of time said sealing module remains open as said drive mechanism rotates.

26. The modular control apparatus of claim 25, wherein said adjustable engagement means comprises a second lever interchangeable with said first lever, said second lever having a second distal surface having greater transverse length than said first distal surface, whereby said camming element engages said second distal surface for a greater duration than said first distal surface and further whereby said second lever biases said sealing module open for a longer time than said first lever.

27. The apparatus of claim 26, wherein said first and said second levers are color-coded.

28. The apparatus of claim 26, further comprising:
a housing member pivotally attached to said valve body, said housing member pivotable between a use position in which said housing member is positioned when the water treatment system is being used and an access position in which said housing member is positioned during servicing thereof, said housing defining a slot; and said sealing member comprising an arm member extending through said slot and into said housing member, whereby an end of said lever engages said arm internally of said housing.

29. The apparatus of claim 28, further comprising a cover removably attached to said housing member, said second lever being stored within said cover, whereby said first and said second levers can be interchanged when said housing member is positioned in said access position.

30. The modular control apparatus of claim 25, wherein said adjustable engagement means comprises at least one removable pin disposed on said drive mechanism, said at least one removable pin comprising said camming element.

31. A modular control apparatus for use in a water treatment system, the apparatus comprising:

a valve body adapted for installation on and fluid communication with a water treatment tank, said valve body including an inlet for receiving untreated water, an outlet for dispensing treated water, a brine tank line adapted for communication with a brine source and a drain passage for dispensing waste water;

a housing member attached to said valve body, said housing member including a drive mechanism mounted therein, said drive mechanism providing operational power to said valve body, a drive motor module mounted in said housing member, said drive motor module driving said drive mechanism; and a first timer module removably mounted in said housing, said first timer module providing electrical power to said drive motor module at a first predetermined interval and thereby initiating a regeneration cycle; and a second timer module interchangeable with said first timer module, said second timer module providing said electrical power to said drive motor module at a second predetermined interval and thereby initiating the regeneration cycle, said second interval differing from said first interval, whereby interchanging said first and second timer modules changes the frequency of the regeneration cycle.

32. The apparatus of claim 31, wherein:
said housing member is pivotally attached to said valve body, said housing member being pivotable between a use position in which said housing member is positioned when the water treatment system is being used and an access position in which said housing member is positioned during servicing thereof, whereby said first and said second timer modules can be interchanged when said housing member is positioned in said access position.

33. The apparatus of claim 31, wherein said first timer module comprises an electro-mechanical timer module.

* * * * *